US010980079B2

(12) United States Patent
Huang et al.

(10) Patent No.: US 10,980,079 B2
(45) Date of Patent: Apr. 13, 2021

(54) METHOD, APPARATUS, AND SYSTEM FOR DATA TRANSMISSION

(71) Applicant: ZTE CORPORATION, Guangdong (CN)

(72) Inventors: Meiqing Huang, Guangdong (CN); Qian Dai, Guangdong (CN); Yuanfang Yu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/074,056

(22) PCT Filed: Nov. 15, 2016

(86) PCT No.: PCT/CN2016/105830
§ 371 (c)(1),
(2) Date: Jul. 30, 2018

(87) PCT Pub. No.: WO2017/133295
PCT Pub. Date: Aug. 10, 2017

(65) Prior Publication Data
US 2019/0045575 A1 Feb. 7, 2019

(30) Foreign Application Priority Data

Feb. 5, 2016 (CN) .......................... 201610082592.5

(51) Int. Cl.
*H04W 76/27* (2018.01)
*H04W 76/10* (2018.01)
(Continued)

(52) U.S. Cl.
CPC ............ *H04W 76/27* (2018.02); *H04W 8/02* (2013.01); *H04W 36/0011* (2013.01);
(Continued)

(58) Field of Classification Search
CPC ..... H04W 76/27; H04W 76/10; H04W 76/20; H04W 8/02; H04W 48/12; H04W 36/0011; H04W 88/06
See application file for complete search history.

(56) References Cited

U.S. PATENT DOCUMENTS

2012/0327910 A1* 12/2012 Dalsgaard ............. H04L 5/0098
370/335
2015/0139192 A1* 5/2015 Zhang .................. H04W 36/04
370/331

(Continued)

OTHER PUBLICATIONS

Supplemental European Search Report dated Nov. 23, 2018, in corresponding European Application No. 16889102.6.

(Continued)

*Primary Examiner* — Redentor Pasia
(74) *Attorney, Agent, or Firm* — Duane Morris LLP

(57) ABSTRACT

A method, apparatus, and system for data transmission, applicable to the UE, comprising: the UE transmitting the uplink interface message to the MME through the base station; the uplink interface message includes instructions to switch data transmission modes, wherein the data transmission modes comprise the Control Plane (CP) mode, the User Plane (UP) mode, and/or the Long-Term Evolution (LTE) mode; the UE receiving the downlink Radio Resource Control (RRC) message transmitted by the base station, wherein, the downlink RRC message includes instructions to switch data transmission modes; the UE switching data transmission modes based on the data transmission mode-switch instructions, and using the data transmission mode after switching to implement data transmission.

21 Claims, 14 Drawing Sheets

(51) Int. Cl.
*H04W 36/00* (2009.01)
*H04W 76/20* (2018.01)
*H04W 8/02* (2009.01)
*H04W 48/12* (2009.01)
*H04W 88/06* (2009.01)

(52) U.S. Cl.
CPC ........... H04W 48/12 (2013.01); H04W 76/10 (2018.02); H04W 76/20 (2018.02); H04W 88/06 (2013.01)

(56) References Cited

U.S. PATENT DOCUMENTS

| | | | |
|---|---|---|---|
| 2018/0332462 A1* | 11/2018 | Kim | H04W 28/02 |
| 2018/0376531 A1* | 12/2018 | Martinez Tarradell | H04W 76/10 |
| 2019/0021130 A1* | 1/2019 | Kim | H04W 76/20 |
| 2019/0028337 A1* | 1/2019 | Ryu | H04W 4/70 |
| 2019/0199466 A1* | 6/2019 | Vikberg | H04W 28/0231 |

OTHER PUBLICATIONS

Qualcomm Incorporated, "Simultaneous support for CP and UP optimisation", SA WG2 Meeting #114, Sophia Antipolis, France, Apr. 2016, S2-162058 (revision of S2-161518), 32 pages.

Huawei Hisilicon, "Discussion on enabling to switch from CP to UP CIoT EPS optimization", 3GPP TSG-CT WG1 ad-hoc meeting on IoT C1A-16xxxx, Sophia Antipolis, France, Apr. 2016, 8 pages.

International Search Report dated Jan. 26, 2017, in corresponding International Application No. PCT/CN2016/105830.

Ericsson, et al., "MTC small data fast path security solution", 3GPPTSG SA WG3 (Security) Meeting #71, Valencia, Spain, S3-130401, Apr. 12, 2013, 10 pages.

Search Report dated Jul. 10, 2019, in priority application No. CN 2016100825925.

Jain, P., "CIoT Drafting", 3GPP, S2-154275, Nov. 16, 2015, 7 pages.

* cited by examiner

METHOD, APPARATUS, AND SYSTEM FOR DATA TRANSMISSION

TECHNICAL FIELD

The present disclosure is related to the field of Communications, especially a method, apparatus, and system for data transmission.

BACKGROUND TECHNIQUE

Following the swift development of wireless communication technology and the increasing user demand for communications, the 5th generation of communication technology (5G) has already become the trend for future network development. An important application of 5G is Machine Type Communication (MTC), which, with its large-scale potential for application, has garnered the widespread attention from a large number of mobile network operators, equipment manufacturers, and research institutes; it will become an important application area for future wireless communication technologies.

MTC application areas comprise Smart Grid, Intelligent Transportation, Smart Home (Home Automation), remote monitoring, and wireless censoring networks, which make up an important component of the burgeoning Internet of Things. Services that support MTC devices are varied. Requirements for most MTC equipment usually include low cost and low power usage, such as the equipment used for environmental monitoring or the large-scale sensors used in agriculture. In addition, operations that support MTC devices typically do not have strict requirements with regard to time delay, but could have sensitive materials that require high speed transmission. From this we see that the services supporting MTC equipment are varied and comprise, for example, periodic service reporting, anomaly reporting, network command issuance, and software version updates. The Quality of Service (QoS) that different operations demand of the network are also different.

In order to effectively lower the cost of MTC equipment and system expenditure of the network-side, the Third Generation Partnership Projects (3GPP) standard has led to the following two modes of small data transmission for optimization of data transmission: the Control Plane (CP) mode and the User Plane (UP) mode. MTC devices are typically configured with one of the above modes, but when the MTC service changes, MTC devices configured for a single data transmission mode cannot fulfill the different QoS requires for multiple MTC services, and the data transmission is less intelligent.

CONTENTS OF THE PRESENT EMBODIMENTS

The present disclosure provides a method, apparatus, and system for data transmission. In the embodiments of the present invention, the User Equipment (UE) actively initiates a switching request of the data transmission mode, and can thus satisfy the QoS requirements for varying services, as well as raise the intelligence of data transmission.

First, the present embodiments provide a method for data transmission, applicable to the UE, comprising: the UE transmitting the uplink interface message to the Mobility Management Entity (MME) through the base station, wherein the uplink interface message contains the data transmission mode-switch instructions, wherein data transmission modes comprise the CP mode, the UP mode, and/or the Long-Term Evolution mode; the UE receiving the downlink radio resource control (RRC) message transmitted by the base station, wherein the downlink RRC message contains the data transmission mode-switch instructions; the UE switching data transmission modes according to the data transmission mode-switch instructions, and uses the data transmission mode after switching for data transmission.

Second, the embodiments of the present disclosure further provide a method for data transmission, applicable to the terminal, comprising: the base station transmitting the uplink interface message to the Mobility Management Entity (MME), wherein the uplink interface message includes instructions to change data transmission modes, and data transmission modes comprise the CP mode, the UP mode, and/or the Long-Term Evolution mode; the base station receiving the downlink interface message transmitted by the MME, wherein the downlink interface message includes instructions to change data transmission modes; the base station switching data transmission modes according to the instructions to change data transmission modes; the base station transmitting the downlink radio resource control (RRC) message to the UE, wherein the downlink RRC message includes instructions to change data transmission modes.

Third, the embodiments of the present disclosure provide a method for data transmission, applicable to the Mobility Management Entity (MME), comprising: the Mobility Management Entity (MME) receiving the uplink interface message transmitted by the base station, wherein the uplink interface message includes instructions to change data transmission modes, and data transmission modes comprise the CP mode, the UP mode, and/or the Long-Term Evolution mode; the MME switching data transmission modes according to the instructions to change data transmission modes; the MME transmitting the downlink interface message to the base station, wherein the downlink interface message includes instructions to change data transmission modes.

Fourth, the embodiments of the present disclosure provide an apparatus for data transmission, configured for the terminal, comprising: the transmission module, configured to transmit the uplink interface message to the MME through the base station, wherein the uplink interface message includes instructions to change data transmission modes; data transmission modes comprise the CP mode, the UP mode, and/or the Long-Term Evolution mode; the receiver module, connected to the transmission module, configured to receive the downlink RRC message transmitted by the base station; the downlink RRC message includes instructions to change data transmission modes; the mode-switching module, connected to the receiver module, configured to switch data transmission modes according to the instructions to switch data transmission modes received by the receiver module; the transmission module and the receiver module are further configured to use the data transmission mode that the mode-switching module has switched to for data transmission.

Fifth, the embodiments of the present disclosure provide an apparatus for data transmission, configured for the base station, comprising: the transmission module, configured to transmit the uplink interface message to the MME, wherein the uplink interface message includes instructions to change data transmission modes; data transmission modes comprise the CP mode, the UP mode, and/or the Long-Term Evolution mode; the receiver module, connected to the transmission module, configured to receive the downlink interface message transmitted by the MME, wherein the downlink interface message includes instructions to change data transmission modes; the mode-switching module, connected to the receiver module, configured to switch data transmission modes according to the instructions to switch data transmission modes received by the receiver module; the transmission module is further configured to transmit the downlink RRC message to the UE; the downlink RRC message includes instructions to change data transmission modes.

Sixth, the embodiments of the present disclosure provide an apparatus for data transmission, configured for the MME, comprising: the receiver module, configured to receive the uplink interface message transmitted by the base station, wherein the uplink interface message includes instructions to change data transmission modes; data transmission modes comprise the CP mode, the UP mode, and/or the Long-Term Evolution mode; the mode-switching module, connected to the receiver module, configured to switch data transmission modes according to the instructions to switch data transmission modes received by the receiver module; the transmission module, connected to the receiver module and the mode-switching module, respectively, configured to transmit the downlink interface message to the base station, wherein the downlink interface message includes instructions to change data transmission modes.

Seventh, the embodiments of the present disclosure provide a system for data transmission, comprising: the UE, the base station, and the MME; wherein, the UE is configured to have any of the apparatus for data transmission of the fourth aspect outlined above, the base station is configured to have any of the apparatus for data transmission of the fifth aspect outlined above, and the MME is configured to have any of the apparatus for data transmission of the sixth aspect outlined above.

Eighth, the embodiments of the present disclosure further provide a non-transitory computer-readable storage medium, which stores computer-executable instructions; the computer-executable instructions are configured to execute any of the UE-side data transmission methods outlined herein.

Ninth, the embodiments of the present disclosure further provide a non-transitory computer-readable storage medium, which stores computer-executable instructions; the computer-executable are configured to execute any of the base station-side data transmission methods outlined herein.

Tenth, a non-transitory computer-readable storage medium, which stores computer-executable instructions; the computer-executable are configured to execute any of the MME-side data transmission methods outlined herein.

Eleventh, the present disclosure further provides an electronic device, comprising: at least one processor; and memory that is linked to at least one processor; wherein, the memory stores instructions executable by at least one processor; the instructions are executed by at least one processor in order for at least one processor to execute any of the UE-side data transmission methods outlined herein.

Twelfth, the embodiments of the present disclosure further provide an electronic device, comprising: at least one processor; and a memory that is linked to at least one processor; wherein, the memory stores instructions executable by at least one processor; the instructions are executed by at least one processor in order for at least one processor to execute any of the base station-side data transmission methods outlined herein.

Thirteenth, the embodiments of the present disclosure further provide an electronic device, comprising: at least one processor; and a memory that is linked to at least one processor; wherein, the memory stores instructions executable by at least one processor; the instructions are executed by at least one processor in order for at least one processor to execute any of the MME-side data transmission methods outlined herein.

Within the method, apparatus, and system for data transmission of the present embodiments, the UE transmits the uplink interface message carrying instructions to change data transmission modes; subsequently the UE receives the downlink RRC message transmitted by the base station; in the same way, the downlink RRC message includes instructions to switch data transmission modes. The UE thus executes the data transmission mode-switch operation based on the instructions to change data transmission modes of the downlink RRC message, and uses the data transmission mode after switching to implement data transmission, wherein, the data transmission modes comprise the CP mode, the UP mode, and the LTE mode. In the embodiments of the present disclosure, the UE actively initiates a request to switch data transmission modes; in this way, data transmission between the UE and the network-side can be switched between different transmission modes, thereby fulfilling the QoS requirements for different services and raising the intelligence of data transmission.

BRIEF DESCRIPTION OF THE DRAWINGS

The accompanying drawings are provided to further the understanding of the technical solutions of the present embodiments, and serve as a component of its descriptions; the drawings are to be used with the embodiments of the present disclosure to explain the technical solutions of the present application, and do not serve to limit the technical solutions of the present disclosure.

DETAILED DESCRIPTION

Figure 1:
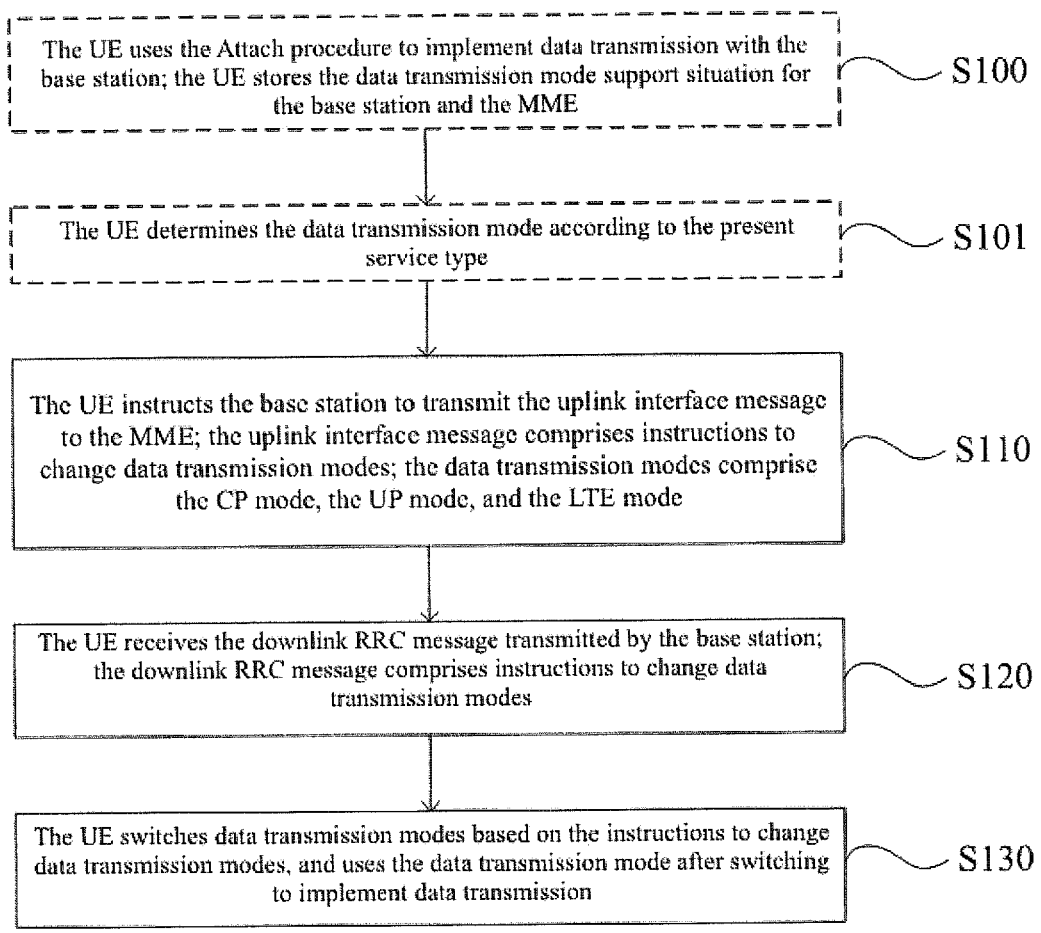
FIG. 1 is a flowchart of the data transmission methods provided by the embodiments of the present disclosure.

The embodiments of the present disclosure are described in detail below with reference to the accompanying drawings. The embodiments and their characteristics may be combined at will in a non-conflicting manner.

The steps illustrated in the accompanying flowcharts can be executed by, for example, a set of computer-executable instructions in a computer system; although the flowcharts illustrate a logical order of execution, the steps illustrated or described can, in some cases, be executed in an order different from that herein.

Belonging to the data transmission modes of the Narrowband-Internet of Things (NB-IoT), the small data transmission modes of the 3GPP standard described above can both lower UE cost and refine the characteristics of small data transmission. The CP mode packs a data packet into a Non-Access Stratum (NAS) Packet Data Unit (PDU), that is, a NAS PDU, and attaches the NAS PDU to the control plane signal for transmission. In the UP mode, the terminal and the network-side use Data Radio Bearer (DRB) for data transmission; after data transmission is complete, both parties store the bearer information context and the Access Stratum (AS) security context, etc. When data is transmitted once more, both parties quickly resume the use of DRB through the suspend-activate flow.

Each of these small data transmission methods has its pros and cons. The CP mode has the following advantages: the conservation of signaling, system expenditure, and terminal power usage; its disadvantages are as follows: first, no DRB is established in the CP mode, and safety performance can be relatively poor. Accordingly, neither the base station nor the UE has the AS security context, and there is no way to implement AS layer encryption on the data; second, it is not suitable for the transmission of relatively large quantities of data, considering that the NAS PDU attached to the signal is limited, and the length of the transmitted data packet is limited. Larger quantities of data must be divided into relatively more smaller packets, and since MTC equipment typically has poor coverage, packets are easily lost. As a result, it is difficult for the receiver to receive a complete packet. Furthermore, the CP mode utilizes signaling for data transmission; too many small data packets will bring too much signal transmission, which will occupy too many resources. Additionally, low-priority data services occupy too many scheduling resources. The MTC terminal typically transmits periodic report data with a relatively low priority, but since the data is attached to the air interface layer signal for transmission, it receives the same scheduling priority as a common Radio Resource Control (RRC) signal, and thus encroaches on the scheduling priority of actual RRC access signals (RRC signaling transmitted without MTC data), which could result in more air interface failures. Besides this, when the network simultaneously supports data utilizing the control plane optimization mode for transmission and the DRB for transmission, because the priority level of the Signaling Radio Bearer (SRB) is always greater than that of the DRB, the low-priority levels can always gain higher scheduling priority levels than that of the DRB so that they are processed first. This could result in being unable to guarantee the high-priority service scheduling of DRB transmission. The UP mode has the following advantages: first, encryption is relatively good. Since the AS security context is retained, the system can implement AS layer encryption on the data. Encryption results have better guarantees than those of NAS layer encryption; second, support for the transmission of relatively larger rates or large packets of data is relatively good. UP has the following disadvantages: first, with regard to signaling optimization results, the UP mode cannot conserve as much signaling as the CP mode. UP must first must first recover the bearer context information before transmitting data; relatively speaking, its signal optimization results are relatively poor. Second, changes to the UE access cells lead to additional context transfer overhead. Due to the relation of the allocations and sites of the service bearer context, when a site or cell accessed by the UE changes, the network-side must either deliver or modify the context between the sites.

The data transmission modes described above are applicable to different services; fire alarm equipment, for example, includes the following service types:

Service 1, Periodic Life-Saving Report Information; this service does not have high time-delay requirements, and its data is as little as tens of bytes.

Service 2, Fire Alarm Report Information; this service has relatively higher time-delay requirements; its data quantities can be as small as tens of bytes or as large as a Megabyte (M) because related video information might need to be reported.

Service 3, Server Commands; this service has relatively higher time-delay requirements and data quantities as low as tens of bytes or even lower.

Service 4, Software Version Updates; this service has relatively low time-delay requirements and relatively large data quantities, as much as a few Megabytes.

When the same UE implements data transmission, the different services described above may exist. When using the CP mode, the big data transmission requirements of Service 2 and Service 4 cannot be met; when using the UP mode, the high time-delay requirements of Service 2 and Service 3 cannot be met. As another example, some UE could require the transmission of data at high rates, such as in portable applications. Smart Glasses could require the transmission of video in real time, and Smart Watches could require the ability to make phone calls. These services would require greater QoS guarantees. In addition, when the UE transmits even larger amounts of data, the data transmission modes of the Long Term Evolution (LTE) system (hereinafter referred to as the LTE mode) have better adaptability. UE configured for any of the data transmission modes outlined above all have difficulty satisfying the varying QoS requirements for different services. As a result, how to improve the adaptability of data transmission modes and data services has become an import problem to be solved.

The technical solutions of the present disclosure are described below through the use of alternate embodiments. The UE of the embodiments of the present disclosure can be MTC equipment of the MTC system, and can also be the UE within the LTE system, and the base station can be the Evolved Node B (eNB) of the LTE system. The alternate embodiments provided by the present disclosure can be combined with each other, and identical or similar concepts or processes may not be repeated in a few of the embodiments.

FIG. 1 is a flowchart of the data transmission methods provided by the embodiments of the present disclosure. The data transmission method of the present embodiment is suitable for implementing data transmission for different service types, and can be executed from the data transmission apparatus.

the data transmission apparatus are implemented using a combination of hardware and software; the apparatus can be integrated onto the UE processor for the processor's use. As FIG. 1 shows, the method of the present embodiment can comprise In S110, the UE transmits the uplink interface message to the Mobility Management Entity (MME) through the base station; the uplink interface message includes instructions to switch data transmission modes; the data transmission modes comprise the CP mode, the UP mode, and/or the LTE mode.

For the data transmission method provided by the present embodiment, the UE and the network-side are configured for multiple data transmission modes, that is, the CP mode, the UP mode, and the LTE mode. Before executing the method of the present embodiment, the UE has already interacted with the base station about information related to the data transmission mode using the Attach procedure; the following information is saved on the UE and the network-side network element: whether or not the CP mode, the UP mode, or the LTE mode is supported. For explanatory purposes, the present embodiment assume that the UE and the network-side both support the preceding three data transmission modes; using the Attach procedure, the UE has already negotiated with the network-side to use one of the data transmission modes suitable for the present service type, and uses this mode for data transmission. When the UE detects that the service type has changed, and that the present data transmission mode is not suitable for the QoS requirements of the new service type, the UE can actively initiate a request to switch data transmission modes, that is, the UE transmits the uplink interface message carrying instructions to switch data transmission modes to the MME through the base station; the uplink interface message is used to instruct the network-side to switch data transmission modes. In implementing the present embodiment, the triggering conditions for the UE to initiate mode-switching are, for example, as follows: the UE that originally used the CP mode for data transmission detects that there is a large amount of data requiring transmission; the UE that originally used the LTE mode for data transmission detects that the data requiring transmission is relatively small. The present embodiment does not limit the reasons for the UE to actively initiate mode-switching; as long as the UE detects that the present data transmission mode is not suitable for the QoS requirements of the present service type, the UE can select the most suitable data transmission mode from within the modes that both the UE and the network-side support.

Within the present embodiment, the switching of data transmission modes comprises: switching between the CP mode and the LTE mode, switching between the UP mode and the LTE mode, or switching between the CP mode and the UP mode. In addition, the UE of the present embodiment can also be MTC equipment. For non-MTC equipment, the CP mode or the UP mode can also be used for data transmission when there is an application scenario with a small data service type, thereby expanding the application range of the data transmission methods provided by the present embodiments.

In S120, the UE receives the downlink RRC message transmitted by the base station; the downlink RRC message includes instructions to switch data transmission modes.

Within the present embodiment, after the MME receives the uplink interface message carrying instructions to switch data transmission modes transmitted by the base station, the MME can switch data transmission modes according to the instructions to switch data transmission modes, whereupon the MME can transmit the downlink interface message carrying instructions to change data transmission modes to the base station on the S1 interface. Within the present embodiment, messages that are transmitted on the S1 interface are defined as the S1 message; the downlink interface message can be a downlink S1 interface message or an added downlink S1 interface message. The base station can execute the data transmission mode-switch operation based on the instructions to switch data transmission modes of the downlink interface message. After the base station has switched data transmission modes, it can transmit the downlink RRC message containing instructions to switch data transmission modes to the terminal.

In S130, the UE switches data transmission modes based on the data transmission mode-switch instructions, and uses the data transmission mode after switching to implement data transmission.

Within the present embodiment, after the UE receives the downlink RRC message transmitted by the base station, it can execute the data transmission mode-switch operation, thereby completing the data transmission mode switch, whereupon the UE and the network-side implement data transmission according to the data transmission mode after switching, wherein the data transmission mode after switching is the data transmission mode suitable for the present service type.

The present embodiment does not limit the data transmission modes of the UE, the base station, and the MME, which may support two of them or all of them. As long as the data transmission mode switched to is supported by both the base station and the MME, switching can be implemented; the process whereby the UE negotiates with the network-side to use a data transmission mode before actively initiating mode-switching has been described above; before S110, the present embodiment can further comprise: S100 and S101.

In S100, the UE implements data transmission with the base station through the Attach procedure; the UE stores the support circumstances of the base station and the MME for the data transmission mode; in S101, the UE determines to switch data transmission modes according to the present service type; in addition, the base station and the MME can store the support circumstances of the UE for the data transmission mode. Therefore, when the UE actively initiates mode-switching, the UE can combine the current service-type and the data transmission modes supported by the network elements to select a mode, thereby improving switching accuracy.

Within the data transmission methods of the present embodiments, the UE transmits the uplink interface message carrying instructions to switch data transmission modes to the MME through the base station; the UE then receives the downlink RRC message transmitted by the base station, the downlink RRC message also includes instructions to switch data transmission modes; the UE thereby executes the data transmission mode-switch operation according to the instructions to switch data transmission modes of the downlink RRC message, and uses the data transmission mode after switching to implement data transmission, wherein, the data transmission modes comprise the CP mode, the UP mode, and/or the LTE mode. Within the present embodiment, the UE actively initiates a switching request of the data transmission mode, and can thus satisfy the QoS requirements for varying services, as well as raise the intelligence of data transmission.

Figure 2:
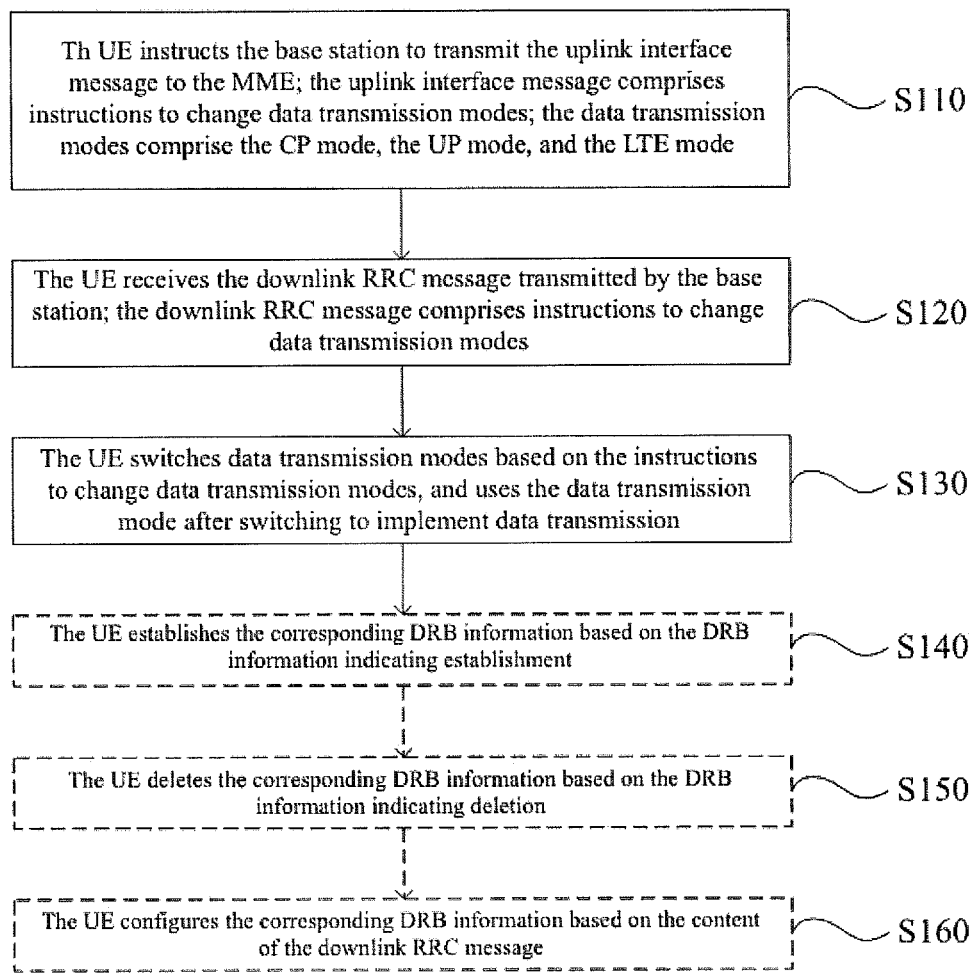
FIG. 2 is another flowchart of the data transmission methods provided by the embodiments of the present disclosure.

Alternatively, FIG. 2 is another flowchart of the data transmission methods provided by the embodiments of the present disclosure. Based on the embodiment illustrated by FIG. 1, the data transmission mode after switching of the present embodiment is the UP mode or the LTE mode, and the data transmission mode before switching is the CP mode. Accordingly, the downlink RRC message that the UE receives further comprises DRB information indicating establishment; after S130, the present embodiment further comprises S140. In S140, the UE establishes the corresponding DRB information based on the DRB information indicating establishment.

In the implementation of the present embodiment, all network elements use the CP mode before switching, and the downlink interface message that the MME transmits to the base station comprises service bearer information indicating establishment; after the base station has switched data transmission modes, it can establish the corresponding service bearer information. Since the UP mode or the LTE mode needs to establish DRB information of the air interface, that is, the base station can still establish DRB information of the bearer service, and DRB information indicating establishment is added to the downlink RRC message transmitted to the UE, the UE will thus establish the corresponding DRB information.

Alternatively, the data transmission mode after switching of the present embodiment is the CP mode. Correspondingly, the downlink RRC message that the UE receives can further comprise DRB information indicating deletion. The present embodiment is illustrated based on the embodiment shown in FIG. 2 and described above, that is, after S130, the method can further comprise S150. In S150, the UE deletes the corresponding DRB information based on the DRB information indicating deletion.

In the implementation of the present embodiment, all network elements use the UP mode or the LTE mode before switching, and the downlink interface message that the MME transmits to the base station comprises service bearer information indicating deletion; after the base station switches data transmission modes, it can delete the corresponding service bearer information.

Since the CP mode does not need to establish the air interface DRB information, that is, the base station can delete existing DRB information of the bearer service, and DRB information indicating deletion is added to the downlink RRC message transmitted to the terminal, the UE will thus delete the corresponding DRB information. In the implementation of the present embodiment, the network-side may not initiate the related process of deleting the bearer service, that is, the MME and the base station do not need to delete the service bearer information, and the base station and the UE do not need to delete the DRB information of the bearer service.

Alternatively, the data transmission mode after switching of the present embodiment is the UP mode, and the data transmission mode before switching is the LTE mode; or, the data transmission mode after switching is the LTE mode, and the data transmission mode before switching is the UP mode; correspondingly, the downlink RRC message received by the UE further comprises: one or more of the following: DRB information indicating establishment, DRB information indicating reconfiguration, and DRB information indicating deletion; the present embodiment is illustrated based on the embodiment shown by FIG. 2 and described above, that is, after S130, the method can further comprise S160. In S160, the UE configures the corresponding DRB information based on the content of the downlink RRC message.

In the implementation of the present embodiment, switching is implemented between the UP mode and the LTE mode, that is, the downlink interface message transmitted by the MME to the base station comprises service bearer information indicating establishment and/or reconfiguration and/or deletion; after switching data transmission modes, the base station can establish and/or reconfigure and/or delete the corresponding service bearer information. Both the UP mode and the LTE mode need to establish air interface DRB information, but for different situations the configured DRB information is not necessarily the same for the two modes. Therefore the base station can still establish and/or reconfigure and/or delete DRB information of the bearer service, and can add DRB information indicating establishment and/or reconfiguration and/or deletion to the downlink RRC message transmitted to the UE; the UE can thus configure the corresponding DRB information. In the implementation of the present embodiment, the network-side may not initiate the related process of reconfiguring the bearer service, that is, the MME and the base station are not required to reconfigure the service bearer information, and the base station and the UE are not required to reconfigure the DRB information of the bearer service.

S140, S150, and S160 of FIG. 2 are alternately selected, and the corresponding service configurations are carried out according to the three data transmission mode-switching situations outlined above.

Within the present embodiment, the UE can instruct to implement data transmission mode-switching through the uplink RRC message, and can further instruct to implement data transmission mode-switching through the uplink NAS message. Alternate embodiments are used for explanation below.

Figure 3:
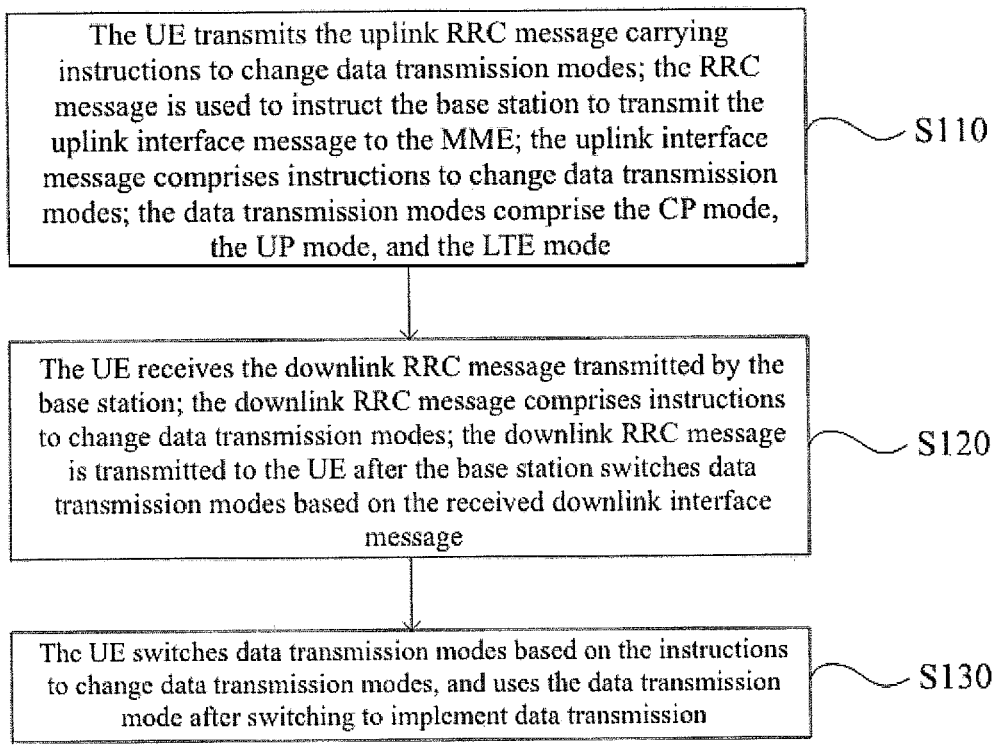
FIG. 3 is another flowchart of the data transmission methods provided by the embodiments of the present disclosure.

Alternatively, FIG. 3 is a flowchart of another method for data transmission provided by the embodiments of the present disclosure. On the basis of the example illustrated by FIG. 1 and outlined above, S110 can be replaced by:

The UE transmitting the uplink RRC message carrying instructions to switch data transmission modes; the uplink RRC message is used to instruct the base station to transmit the uplink interface message to the MME; when the UE is in an idle state, the uplink RRC message can be an RRC Connection Request message; when the UE is in a connected state, the uplink RRC message can be a RRC Connection Re-establishment message; the uplink interface message of the present embodiment can be an uplink S1 interface message or an added S1 interface message; the uplink S1 message transmitted by the base station to the MME can be the Initial UE Message; the downlink RRC message of the present embodiment is sent to the UE from the base station after the base station has switched data transmission modes according to the received downlink interface message; the downlink interface message also includes instructions to switch data transmission modes. When the UE is an idle state, the downlink RRC message it receives can be the RRC Connection Setup message; when the UE is a connected state, the downlink RRC message it receives can be the RRC Connection Reconfiguration message.

Figure 4:
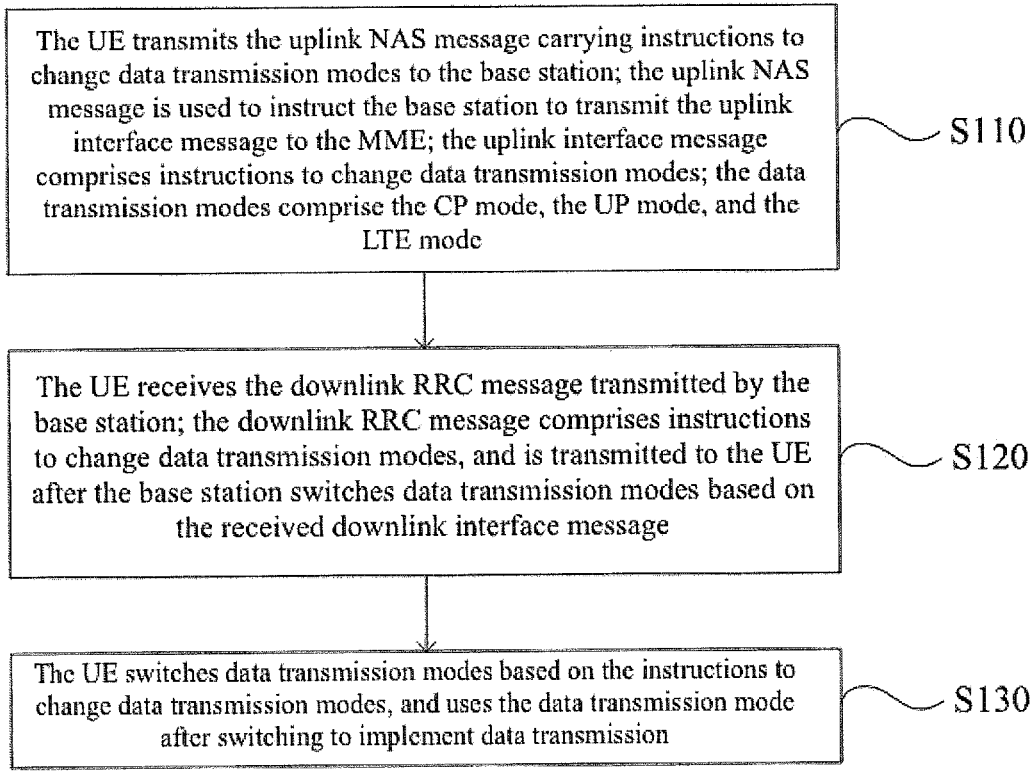
FIG. 4 is another flowchart of the data transmission methods provided by the embodiments of the present disclosure.

Alternatively, FIG. 4 is another flowchart of the data transmission method provided by the embodiments of the present disclosure. Within the present embodiment, the UE uses the uplink NAS message to instruct to switch data transmission modes. Based on the embodiment illustrated by FIG. 1, S110 can be replaced by:

The UE transmitting the uplink NAS message carrying instructions to switch data transmission modes to the base station; the uplink NAS message is used to instruct the base station to transmit the uplink interface message to the MME; the uplink NAS message directly transmitted by the UE to alert the MME can be a Service Request message. After switching data transmission modes, the MME transmits the downlink interface message (that is, the downlink S1 interface message) to the base station, which could be an Initial Context Setup Request message; the downlink RRC message of the present embodiment is sent to the UE from the base station after the base station has switched data transmission modes according to the received downlink interface message; the downlink NAS message is attached to the downlink interface message and the downlink RRC message; the downlink NAS message includes instructions to change data transmission modes, and the downlink RRC message transmitted by the base station to the UE can be the RRC Connection Reconfiguration message.

In the implementation of the present embodiment, the form of the instructions to change data transmission modes can be diversified, such as the data transmission mode-switch instructions comprising the target data transmission mode to be switched to; or, for example, the data transmission mode-switch instructions comprising a Bitmap used for instructing to switch to the target data transmission mode; as another example, the data transmission mode-switch instructions can comprise the reason for switching data transmission modes, such as through indicating that the present data transmission mode is unavailable.

Figure 5:
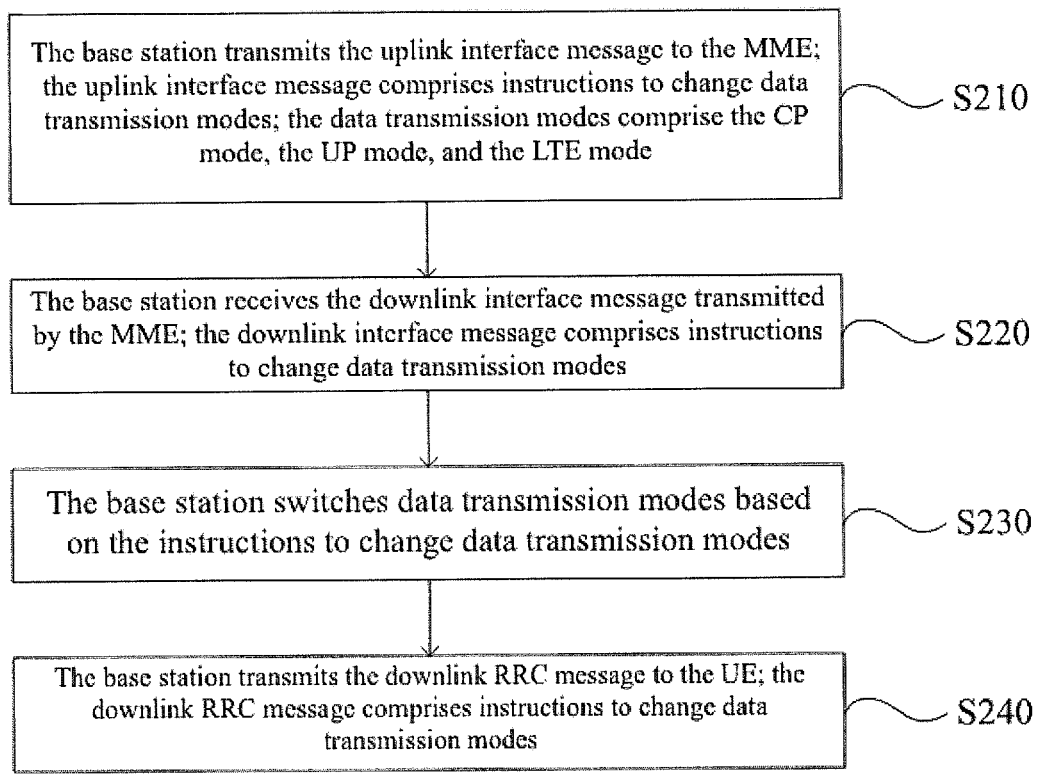
FIG. 5 is another flowchart of the data transmission methods provided by the embodiments of the present disclosure.

FIG. 5 is another flowchart of the data transmission method provided by the embodiments of the present disclosure. The data transmission method of the present embodiment is suitable for implementing data transmission for different service types, and can be executed from the data transmission apparatus; the data transmission apparatus are implemented using a combination of hardware and software; the apparatus can be integrated onto a base station processor for the processor's use. As FIG. 5 shows, the method of the present embodiment can comprise:

In S210, the base station transmits the uplink interface message to the MME; the uplink interface message includes instructions to switch data transmission modes, wherein the data transmission modes comprise the CP mode, the UP mode, and/or the LTE mode.

The methods for data transmission provided by the embodiment of the present disclosure are various data transmission modes configured for the base station and other network elements (i.e., the CP mode, the UP mode, and the LTE mode). Before executing the methods of the present embodiments, the UE has already interacted with the base station about information related to the data transmission mode using the Attach procedure, and the following is stored on the network element: whether or not the CP mode, the UP mode, or the LTE mode is supported. Within the present embodiment, when the UE detects that the service type has changed, and that the present data transmission mode is not suitable for the QoS requirements of the new service type, the UE can actively initiate a data transmission mode-switch request, that is, the base station receives the uplink RRC message carrying instructions to change data transmission modes transmitted by the UE, thereby instructing the base station to transmit the uplink interface message carrying instructions to change data transmission modes to the MME, and the base station and the MME can change data transmission modes according to this information.

The form of the data transmission mode-switching, the triggering conditions for the UE to initiate mode-switching, the UE types, and the data transmission modes supported by the network element of the present embodiment have all been described in the foregoing embodiments and will not be discussed further here.

In S220, the base station receives the downlink interface message transmitted by the MME, wherein the downlink interface message includes instructions to change data transmission modes.

In S230, the base station switches data transmission modes according to the instructions to change data transmission modes.

Within the present embodiment, after the base station transmits the uplink interface message to the MME, the MME can change data transmission modes according to the instructions to change data transmission modes of the uplink interface message; the MME can then transmit the downlink interface message carrying instructions to change data transmission modes on the S1 interface to the base station; after receiving the downlink interface message, the base station can perform the data transmission mode-switch operation.

In S240, the base station transmits the downlink RRC message to the UE; the downlink RRC message includes instructions to switch data transmission modes.

Within the present embodiment, after performing the data transmission mode-switch operation, the base station can transmit the downlink RRC message carrying instructions to switch data transmission modes to the UE, instructing the UE to switch data transmission modes, thereby completing the data transmission mode-switch process. Subsequently, the base station, the UE, and the MME implement data transmission according to the data transmission mode after switching, wherein the data transmission mode after switching is the data transmission mode suitable for the present service type.

Within the data transmission methods of the present embodiments, the base station transmits the uplink interface message carrying instructions to switch data transmission modes to the MME in order to instruct the MME to switch data transmission modes; subsequently, the base station receives the downlink interface message carrying instructions to change data transmission modes transmitted by the MME, whereupon the base station switches data transmission modes, and transmits the downlink RRC message carrying instructions to change data transmission modes to the UE in order to instruct the UE to complete the data transmission mode-switch; the data transmission modes comprise the CP mode, the UP mode, and the LTE mode. Within the present embodiment, the UE actively initiates a switching request of the data transmission mode, and can thus satisfy the QoS requirements for varying services, as well as raise the intelligence of data transmission.

Figure 6:
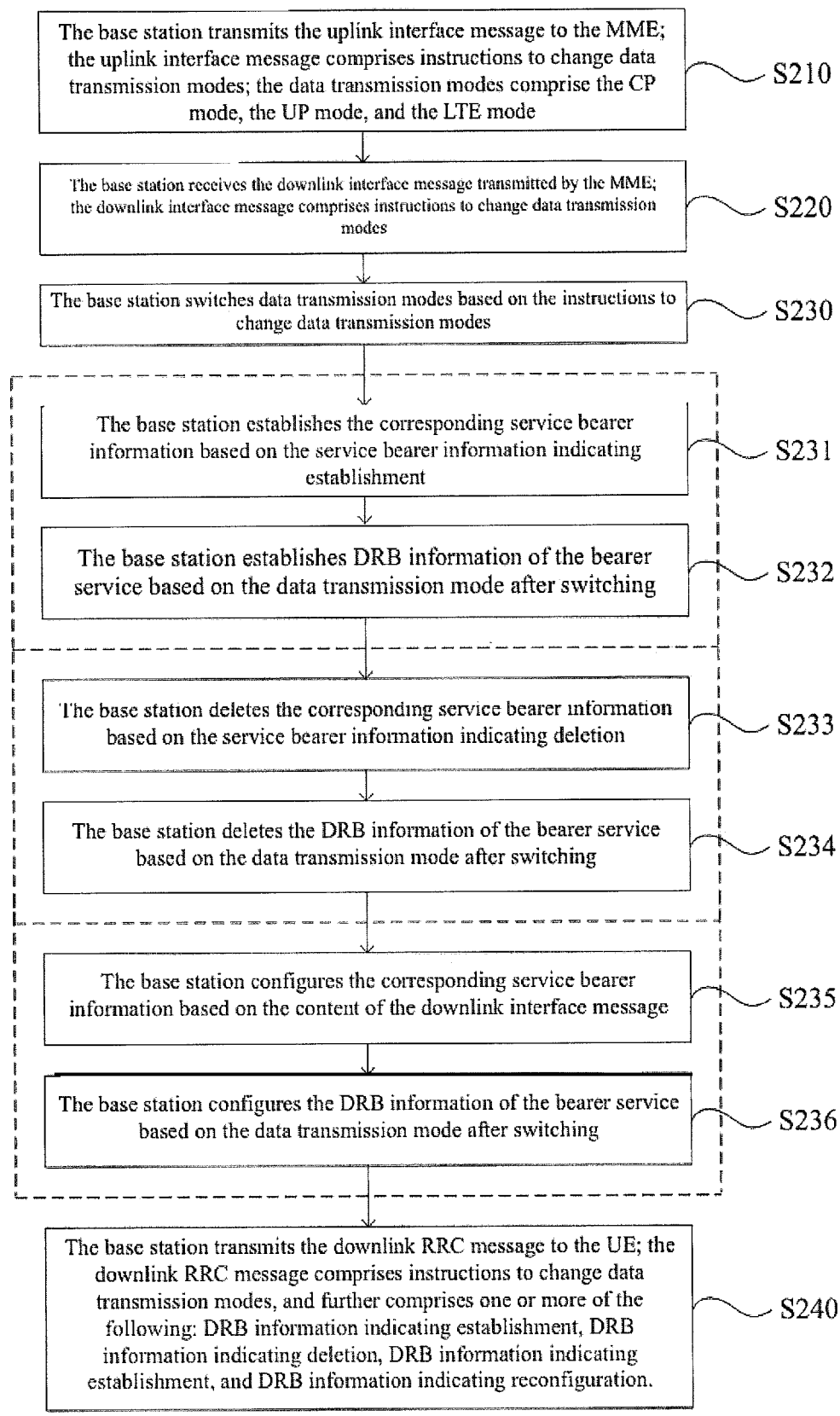
FIG. 6 is another flowchart of the data transmission methods provided by the embodiments of the present disclosure.

Alternatively, FIG. 6 is another flowchart of the data transmission method provided by the embodiments of the present disclosure. Based on the embodiment illustrated by FIG. 5 and described above, the data transmission mode after switching of the present embodiment is the UP mode or the LTE mode, and the data transmission mode before switching is the CP mode; correspondingly, the downlink interface message received by the base station further comprises service bearer information indicating establishment. After S230, the present embodiment further comprises S231. In S231, the base station establishes the corresponding service bearer information according to the service bearer information indicating establishment. Alternatively, after S231, the the present embodiment further comprises S232. In S232, the base station establishes DRB information of the bearer service according to the data transmission mode after switching. Correspondingly, the downlink RRC message transmitted by the base station further comprises DRB information indicating establishment.

In the implementation of the present embodiment, all network elements use the CP mode before switching, and the downlink interface message transmitted from the MME to the base station comprises service bearer information indicating establishment. After the base station has switched data transmission modes, it can establish the corresponding service bearer information. Since the UP mode and the LTE mode need to establish air interface DRB information, that is, the base station can still establish the DRB information of the bearer service, and DRB information indicating establishment is added to the downlink RRC message transmitted to the UE, the UE will thus establish the corresponding DRB information.

Alternatively, the data transmission mode after switching of the present embodiment is the CP mode; correspondingly, the downlink interface message received by the base station further comprises service bearer information indicating deletion; the present embodiment is explained on the basis of the example illustrated by FIG. 6, that is, after S230 further comprises S233. In S233, the base station deletes the corresponding service bearer information based on the service bearer information indicating deletion. Alternatively, after S233 the present embodiment further comprises S234. In S234, the base station deletes DRB information of the bearer service according to the data transmission mode after switching; correspondingly, the downlink RRC message transmitted by the base station further comprises DRB information indicating deletion.

In the implementation of the present embodiment, all network elements use the UP mode or the LTE mode before switching, and the downlink interface message that the MME transmits to the base station comprises service bearer information indicating deletion; after the base station switches data transmission modes, it can delete the corresponding service bearer information. Since the CP mode does not need to establish the air interface DRB information, that is, the base station can delete existing DRB information of the bearer service, and DRB information indicating deletion is added to the downlink RRC message transmitted to the terminal; the UE will thus delete the corresponding DRB information. In the implementation of the present embodiment, the network-side may not initiate the related process of deleting the bearer service, that is, the MME and the base station do not need to delete the service bearer information, and the base station and the UE do not need to delete the DRB information of the bearer service.

Alternatively, the data transmission mode after switching of the present embodiment is the UP mode, and the data transmission mode before switching is the LTE mode; or, the data transmission mode after switching is the LTE mode, and the data transmission mode before switching is the UP mode; correspondingly, the downlink interface message received by the base station further comprises one or more of the following: service bearer information indicating establishment, service bearer information indicating reconfiguration, and service bearer information indicating deletion; the present embodiment is illustrated on the basis of the example shown in FIG. 6 and described above, that is, after S230 the method further comprises S235. In S235, the base station configures the corresponding service bearer information according to the content of the downlink interface message. Alternatively, after S235, the present embodiment can further comprise S236. In S236, the base station configures DRB information of the bearer service according to the data transmission mode after switching; correspondingly, the downlink RRC message transmitted by the base station further comprises one or more of the following: DRB information indicating establishment, DRB information indicating reconfiguration, and DRB information indicating deletion.

In the implementation of the present embodiment, switching is implemented between the UP mode and the LTE mode, that is, the downlink interface message transmitted by the MME to the base station comprises service bearer information indicating establishment and/or reconfiguration and/or deletion; after switching data transmission modes, the base station can establish and/or reconfigure and/or delete the corresponding service bearer information. Both the UP mode and the LTE mode need to establish air interface DRB information, but for different situations the configured DRB information is not necessarily the same for the two modes. Therefore the base station can still establish and/or reconfigure and/or delete DRB information of the bearer service, and can add DRB information indicating establishment and/or reconfiguration and/or deletion to the downlink RRC message transmitted to the UE; the UE can thus configure the corresponding DRB information. In the implementation of the present embodiment, the network-side may not initiate the related process of reconfiguring the bearer service, that is, MME and the base station are not required to reconfigure the service bearer information, and the base station and the UE are not required to reconfigure the DRB information of the bearer service.

S231~S232, S233~S234, and S235~S236 are chosen alternately, and the corresponding service configuration is carried out according to the three data transmission mode-switching situations outlined above.

Within the present embodiments, the UE can instruct to implement data transmission mode-switching through the uplink RRC message, and can further instruct to implement data transmission mode-switching through the uplink NAS message. Alternate embodiments are used for explanation below.

Figure 7:
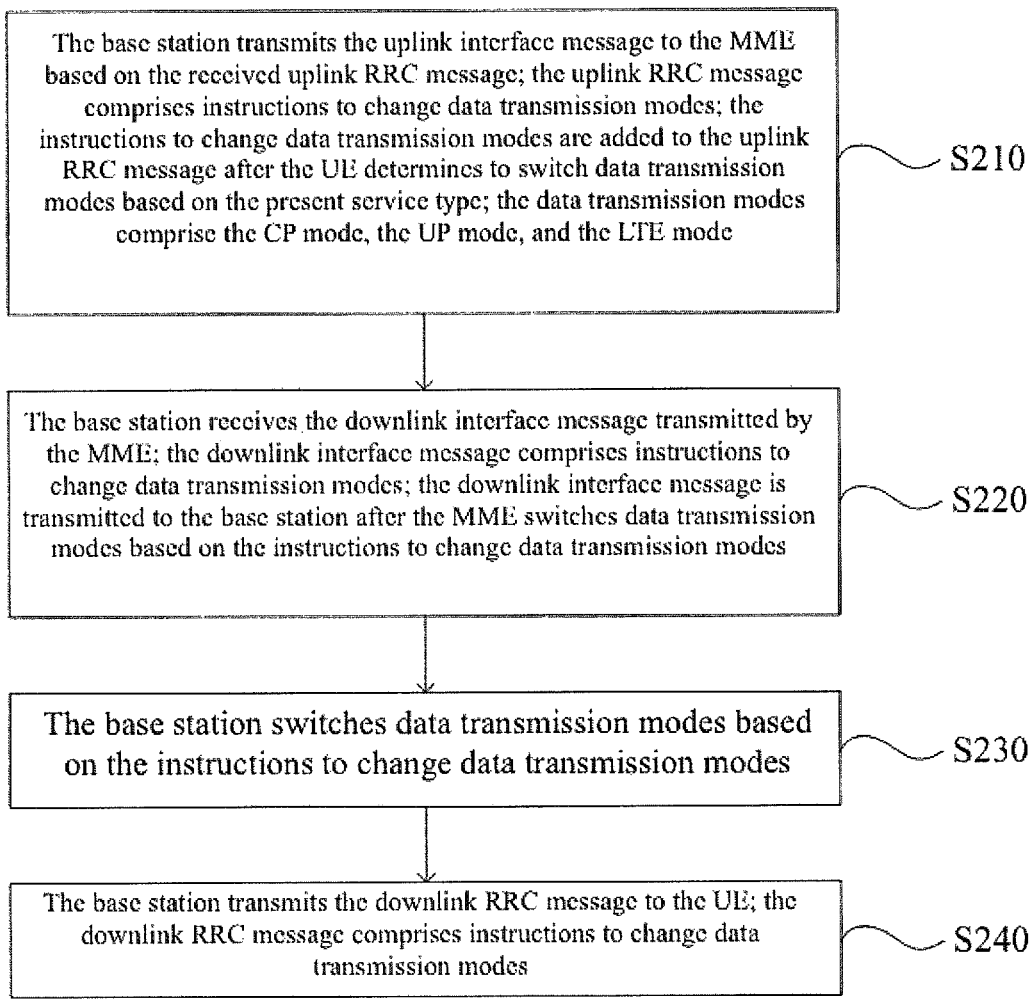
FIG. 7 is another flowchart of the data transmission methods provided by the embodiments of the present disclosure.

Alternatively, FIG. 7 is another flowchart of the data transmission methods provided by the embodiments of the present disclosure. Within the present embodiment, the UE instructs for data transmission mode-switching using the uplink RRC message; on the basis of the example illustrated by FIG. 5 and described above, S210 can be replaced by: the base station transmitting the uplink interface message to the MME based on the uplink RRC message received by the base station;

the uplink RRC message includes instructions to change data transmission modes; the data transmission mode-switch instructions are added to the uplink RRC message after the UE determines to switch data transmission modes based on the present service type. Correspondingly, the downlink interface message of the present embodiment is transmitted to the base station after the MME changes data transmission modes according to the data transmission mode-switch instructions. Within the present embodiment, the type of uplink RRC message, uplink interface message, and downlink RRC message are the same as the foregoing embodiments, and will not be discussed further here.

Figure 8:
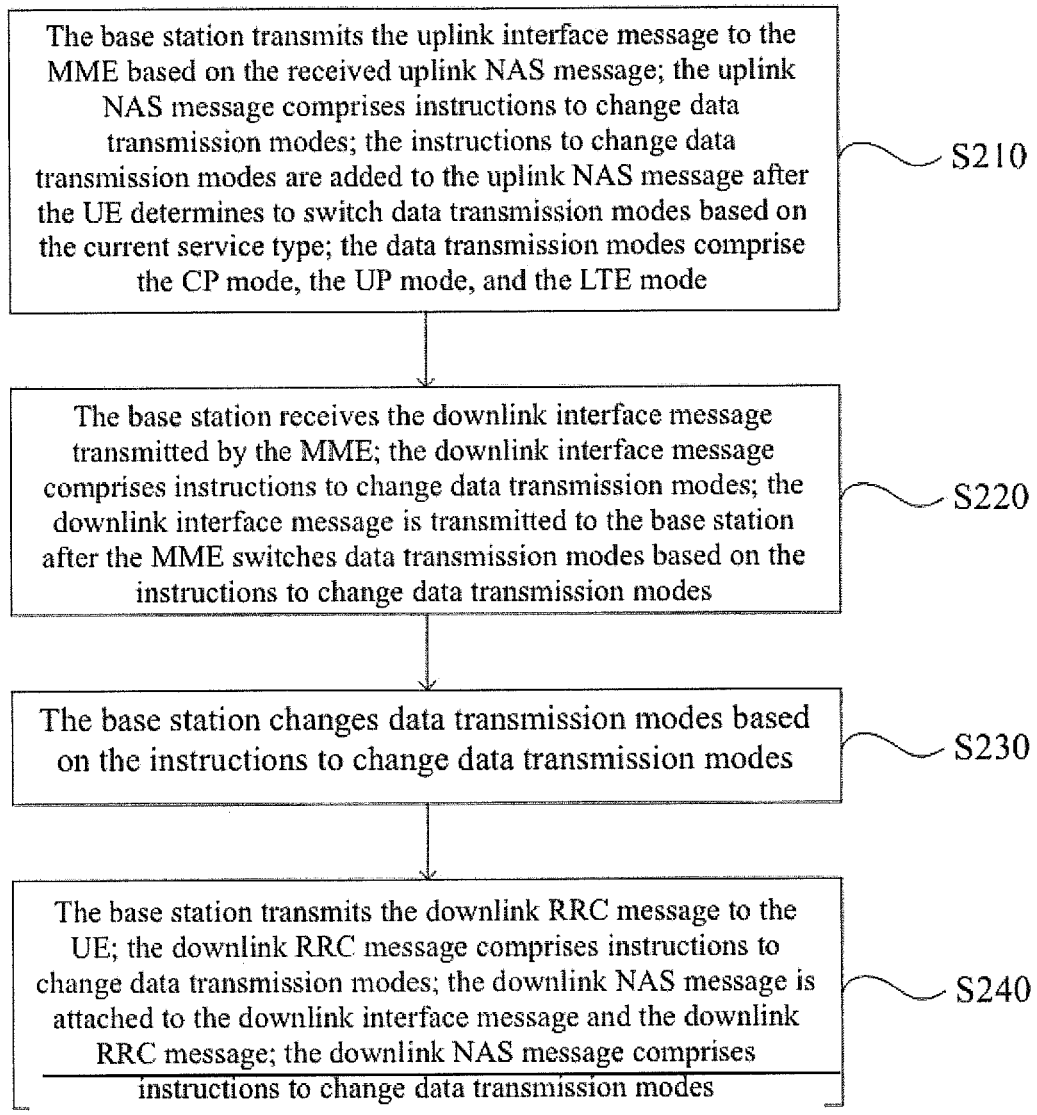
FIG. 8 is another flowchart of the data transmission methods provided by the embodiments of the present disclosure.

Alternatively, FIG. 8 is another flowchart of the data transmission method provided by the embodiments of the present disclosure. Within the present embodiment, the UE instructs for the implementation of data transmission mode-switching using the uplink NAS message; based on the example shown in FIG. 5 and described above, S210 can be replaced by: the base station transmitting the uplink interface message to the MME based on the received uplink NAS message; the uplink NAS message comprises instructions to switch data transmission modes; the instructions to change data transmission modes are added to the NAS message after the UE determines to switch data transmission modes based on the present service type. Correspondingly, the downlink interface message of the present embodiment is transmitted to the base station after the MME changes data transmission modes according to the data transmission mode-switch instructions; the downlink NAS message is attached to the downlink access message and the downlink RRC message; the downlink NAS message includes instructions to change data transmission modes. Within the present embodiment, the type of uplink NAS message, downlink access message, and downlink RRC message are the same as those in the foregoing embodiments, and thus will not be discussed further here.

In the implementation of the present embodiment, the form of the data transmission mode-switch instructions can also be diversified, such as the data transmission mode-switch instructions comprising the target data transmission mode to be switched to; or, for example, the data transmission mode-switch instructions comprising a Bitmap used for instructing to switch to the target data transmission mode; as another example, the data transmission mode-switch instructions can comprise the reason for switching data transmission modes, such as through indicating that the present data transmission mode is unavailable.

Figure 9:
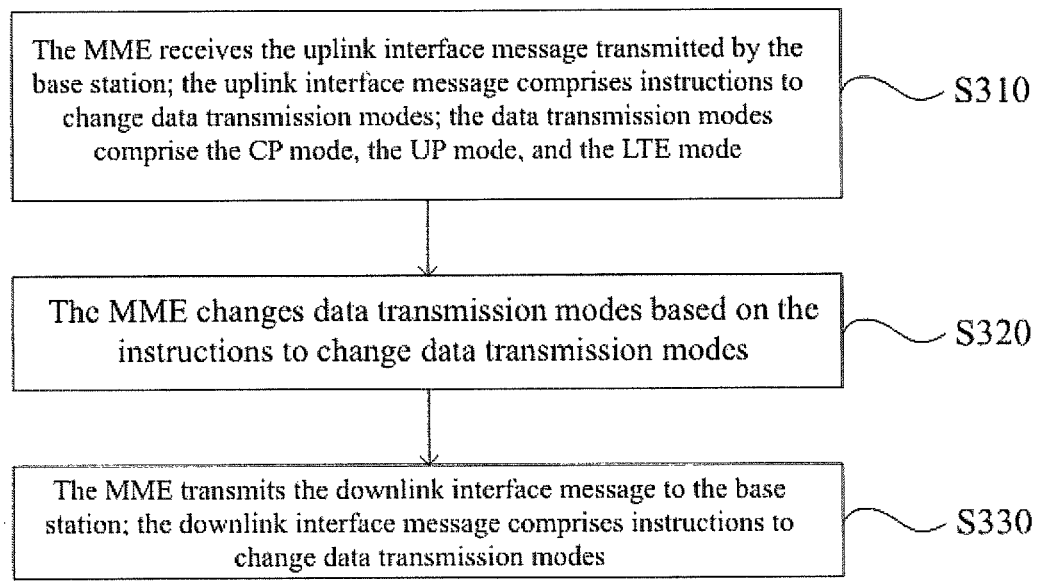
FIG. 9 is another flowchart of the data transmission methods provided by the embodiments of the present disclosure.

FIG. 9 is another flowchart of the data transmission method provided by the embodiments of the present disclosure. The data transmission method of the present embodiment is suitable for implementing data transmission for different service types, and can be executed from the data transmission apparatus; the data transmission apparatus are implemented using a combination of hardware and software; the apparatus can be integrated onto an MME processor for the processor's use. As is shown in FIG. 8, the method of the present embodiment can comprise:

In S310, the MME receives the uplink interface message transmitted by the base station; the uplink interface message includes instructions to switch data transmission modes, wherein the data transmission modes comprise the CP mode, the UP mode, and/or the LTE mode.

The data transmission methods provided by the embodiment of the present disclosure are various data transmission modes (i.e., the CP mode, the UP mode, and the LTE mode) configured for the MME and other network elements. Before performing the methods provided by the present embodiment, the UE has already interacted with the base station about information related to the data transmission mode using the Attach procedure, and the network element has stored whether or not the CP mode, the UP mode, or the LTE mode is supported. Within the present embodiment, when the UE detects that the service type has changed, and that the present data transmission mode is not suitable for the QoS requirements of the new service type, the UE can actively initiate a data transmission mode-switch request, that is, the MME can receive the uplink interface message carrying the data transmission mode-switch instructions transmitted by the base station; the MME and the base station can switch data transmission modes based on this information.

The form of the data transmission mode-switching, the triggering conditions for the UE to initiate mode switching, the UE types, and the data transmission modes supported by the network element of the present embodiment have all been described in the foregoing embodiments and will not be discussed further here.

In S320, the MME switches data transmission modes according to the data transmission mode-switch instructions.

In S330, the MME transmits the downlink interface message to the base station; the downlink interface message comprises instructions to switch data transmission modes.

Within the present embodiment, after receiving the uplink interface message carrying instructions to change data transmission modes transmitted by the UE through the base station, the MME can switch data transmission modes based on the data transmission mode-switch instructions, and transmit the downlink interface message carrying instructions to switch data transmission modes to the base station on the S1 interface in order to instruct the base station to perform the mode-switch operation; the base station can then proceed to instruct the UE to perform the mode-switch operation, thereby completing the data transmission mode-switch process; that is, between the MME and the base station, and the UE and the network-side, data transmission is implemented according to the data transmission mode after switching, wherein the data transmission mode after switching is the data transmission mode suitable for the present service type.

Within the data transmission methods of the present embodiment, the MME switches data transmission modes based on the received uplink interface message carrying instructions to change data transmission modes transmitted by the base station. Subsequently, the MME transmits the downlink interface message carrying data transmission mode-switch instructions to the base station; by way of the downlink interface message instructions, the base station switches data transmission modes, thereby completing the UE-initiated data transmission mode-switching instructions, wherein, the data transmission modes comprise the CP mode, the UP mode, and the LTE mode. Within the present embodiment, the UE actively initiates the data transmission mode-switching request so that switching can be implemented between different data transmission modes for data transmission between the UE and the network-side, thereby fulfilling QoS requirements for different services and improving data transmission intelligence.

Alternatively, the data transmission mode after switching of the present embodiment is the UP mode or the LTE mode, and the data transmission mode before switching is the CP mode; correspondingly, the downlink interface message transmitted by the MME of S330 of the present embodiment further comprises service bearer information indicating establishment.

In the implementation of the present embodiment, all network elements use the CP mode before switching, and the downlink interface message transmitted by the MME to the base station comprises service bearer information indicating establishment; after the base station has switched data transmission modes, it can establish the corresponding service bearer information. Since the UP mode and the LTE mode need to establish air interface DRB information, that is, the base station can still establish DRB information of the bearer service, and DRB information indicating establishment is added to the downlink RRC message transmitted to the UE, the UE will thus establish the corresponding DRB information.

Alternatively, the data transmission mode after switching of the present embodiment is the CP mode; correspondingly, the downlink interface message transmitted by the MME of S330 of the present embodiment further comprises service bearer information indicating deletion.

In the implementation of the present embodiment, all network elements use the UP mode or the LTE mode before switching, and the downlink interface message that the MME transmits to the base station comprises service bearer information indicating deletion; after the base station switches data transmission modes, it can delete the corresponding service bearer information. Since the CP mode does not need to establish the air interface DRB information, that is, the base station can delete existing DRB information of the bearer service, and DRB information indicating deletion is added to the downlink RRC message transmitted to the terminal, the UE will thus delete the corresponding DRB information. In the implementation of the present embodiment, the network-side may not initiate the related process of deleting the bearer service, that is, the MME and the base station do not need to delete the service bearer information, and the base station and the UE do not need to delete the DRB information of the bearer service.

Alternatively, the data transmission mode after switching of the present embodiment is the UP mode, and the data transmission mode before switching is the LTE mode; or, the data transmission mode after switching is the LTE mode, and the data transmission mode before switching is the UP mode; correspondingly, the downlink interface message transmitted by the MME in S330 of the present embodiment further comprises one or more of the following: service bearer information indicating establishment, service bearer information indicating reconfiguration, and service bearer information indicating deletion.

In the implementation of the present embodiment, switching is implemented between the UP mode and the LTE mode; that is, the downlink interface message transmitted by the MME to the base station comprises service bearer information indicating establishment and/or reconfiguration and/or deletion; after switching data transmission modes, the base station can establish and/or reconfigure and/or delete the corresponding service bearer information. Both the UP mode and the LTE mode need to establish air interface DRB information, but for different situations the configured DRB information is not necessarily the same for the two modes. Therefore the base station can still establish and/or reconfigure and/or delete DRB information of the bearer service, and can add DRB information indicating establishment and/or reconfiguration and/or deletion to the downlink RRC message transmitted to the UE; the UE can thus configure the corresponding DRB information. In the implementation of the present embodiment, the network-side may not initiate the related process of reconfiguring the bearer service; that is, the MME and the base station are not required to reconfigure the service bearer information, and the base station and the UE are not required to reconfigure the DRB information of the bearer service.

Within the present embodiment, the MME can receive the mode-switching instructions from the uplink RRC message transmitted by the UE, and can also receive the mode-switching instructions from the uplink NAS message transmitted by the UE. The following makes use of alternate embodiments as a means for explanation.

Alternatively, the MME of the present embodiment receives the mode-switching instructions from the uplink RRC message transmitted by the UE; the uplink interface message of the present embodiment is transmitted to the MME after the base station receives the uplink RRC message; the uplink RRC message includes instructions to change data transmission modes, wherein the data transmission mode-switch instructions are added to the uplink RRC message after the UE determines to switch data transmission modes based on the present service type. Within the present embodiment, the type of uplink RRC message, uplink interface message, downlink interface message, and downlink RRC message are the same as those of the foregoing embodiments, and will not be discussed further here.

Alternatively, the MME of the present embodiment receives the mode-switching instructions through the uplink NAS message transmitted by the UE; the uplink interface message of the present embodiment is transmitted to the MME after the base station has received the uplink NAS message; the uplink NAS message includes instructions to switch data transmission modes, wherein the instructions to change data transmission modes are added to the NAS message after the UE determines to switch data transmission modes based on the present service type; wherein, the downlink interface message is used to instruct the base station to transmit the downlink RRC message carrying instructions to switch data transmission modes to the terminal; the downlink NAS message is attached to the downlink interface message and the downlink RRC message; the downlink NAS message includes instructions to change data transmission modes. Within the present embodiment, the type of uplink NAS message and uplink interface message are the same as those of the foregoing embodiments, and will not be discussed further here.

In the implementation of the present embodiment, the form of the data transmission mode-switch instructions can also be diversified, such as the data transmission mode-switch instructions comprising the target data transmission mode to be switched to; or, for example, the data transmission mode-switch instructions comprising a Bitmap used for instructing to switch to the target data transmission mode; as another example, the data transmission mode-switch instructions can comprise the reason for switching data transmission modes, such as through indicating that the present data transmission mode is unavailable.

Figure 10:
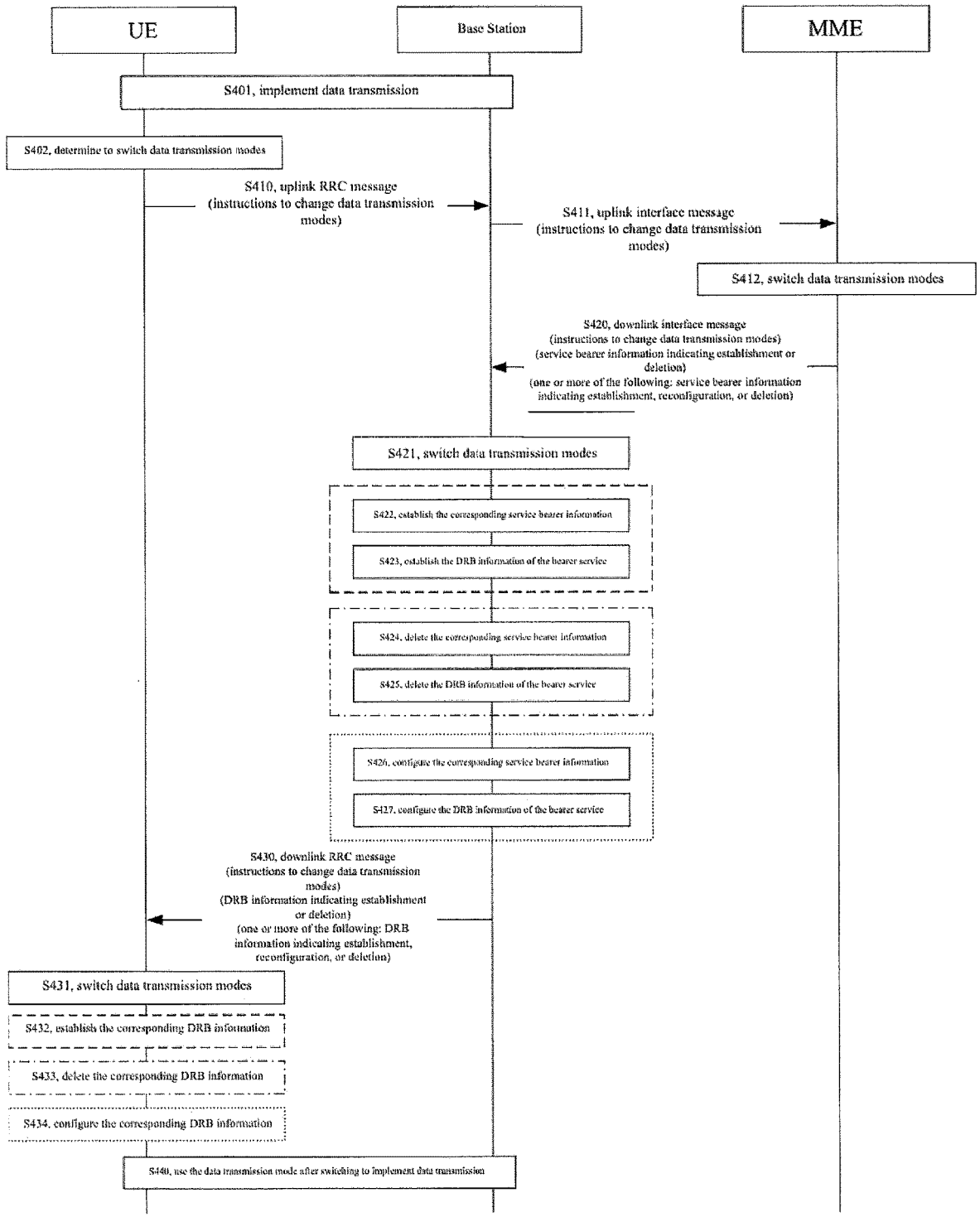
FIG. 10 is a signaling interaction flowchart of the data transmission methods provided by the embodiments of the present disclosure.

FIG. 10 is a signaling interaction flowchart of the data transmission methods provided by the embodiments of the present disclosure.

The data transmission method of the present embodiment is suitable for the implementation of data transmission for different service type scenarios; the method can be executed by the UE, the base station, and the MME. The present embodiment uses, as an illustrative example, the UE instructing for data transmission mode-switching by way of the uplink RRC message. As shown in FIG. 10, the method of the present embodiment can comprise:

In S410, the UE transmitting the uplink RRC message carrying instructions to switch data transmission modes; the data transmission modes comprise the CP mode, the UP mode, and/or the LTE mode.

In S411, the base station transmitting the uplink interface message carrying instructions to change data transmission modes to the MME; the uplink interface message of the present embodiment can be an uplink S1 interface message or an added S1 interface message.

In S412, the MME switching data transmission modes according to the data transmission mode-switch instructions.

In S420, the MME transmitting the downlink interface message carrying data transmission mode-switch instructions to the base station; the downlink interface message of the present embodiment can be a downlink S1 interface or an added downlink S1 interface message.

In S421, the base station switching data transmission modes according to the instructions to change data transmission modes.

In S430, the base station transmitting the downlink RRC message carrying instructions to switch data transmission modes to the UE.

In S431, the UE switching data transmission modes based on the data transmission mode-switch instructions.

In S440, the UE uses the data transmission mode after switching to implement data transmission.

Preceding S410, the present embodiment can further comprise: S401 and S402.

In S401, the UE implements data transmission with the base station through the Attach procedure; the UE stores the support circumstances of the base station and the MME for the data transmission mode.

In S402, the UE determines to switch data transmission modes according to the present service type. The triggering conditions of the present embodiment for the UE to switch data transmission modes are the same as those of the foregoing embodiments, and will not be discussed further here.

In an application scenario of the present embodiments, the data transmission mode after switching is the UP mode or the LTE mode, and the data transmission mode before switching is the CP mode; the downlink interface message transmitted by the MME in S420 of the present embodiment further comprises: service bearer information indicating establishment. Correspondingly, after S421, the present embodiment further comprises:

In S422, the base station establishes the corresponding service bearer information according to the service bearer information indicating establishment.

Alternatively, the present embodiment further comprises: in S423, the base station establishes DRB information of the bearer service according to the data transmission mode after switching. Correspondingly, in S430, the downlink RRC message transmitted from the base station to the UE further comprises DRB information indicating establishment. After S431, the present embodiment further comprises:

In S432, the UE establishes the corresponding DRB information based on the DRB information indicating establishment.

In another application scenario of the present embodiment, the data transmission mode after switching is the CP mode; the downlink interface message transmitted by the MME in S420 of the present embodiment further comprises service bearer information indicating deletion; correspondingly, after S421, the present embodiment further comprises:

In S424, the base station deletes the corresponding service bearer information based on the service bearer information indicating deletion.

Alternatively, the present embodiment further comprises: in S425, the base station deletes DRB information of the bearer service according to the data transmission mode after switching. Correspondingly, the downlink RRC message transmitted from the base station to the UE in S430 further comprises DRB information indicating deletion. After S431, the present embodiment further comprises:

in S433, the UE deletes the corresponding DRB information based on the DRB information indicating deletion.

In another application scenario of the present embodiment, the data transmission mode after switching is the UP mode, and the data transmission mode before switching is the LTE mode; or, the data transmission mode after switching is the LTE mode, and the data transmission mode before switching is the UP mode; the downlink interface message transmitted by the MME in S420 of the present embodiment further comprises one or more of the following: service bearer information indicating establishment, service bearer information indicating reconfiguration, and service bearer information indicating deletion; correspondingly, after S421, the present embodiment further comprises:

In S426, the base station configures the corresponding service bearer information based on the content of the downlink interface message.

Alternatively, the present embodiment further comprises: in S427, the base station configuring DRB information of the bearer service according to the data transmission mode after switching. Correspondingly, in S430, the downlink RRC message transmitted from the base station to the UE further comprises one or more of the following: DRB information indicating establishment, DRB information indicating reconfiguration, and DRB information indicating deletion. After S431, the present embodiment further comprises:

In S434, the UE configuring the corresponding DRB information based on the content of the downlink RRC message.

Within the present embodiment, the type of uplink RRC message, uplink interface message, downlink interface message, and downlink RRC message are the same as those of the foregoing embodiments, and will not be discussed further here.

Figure 11:
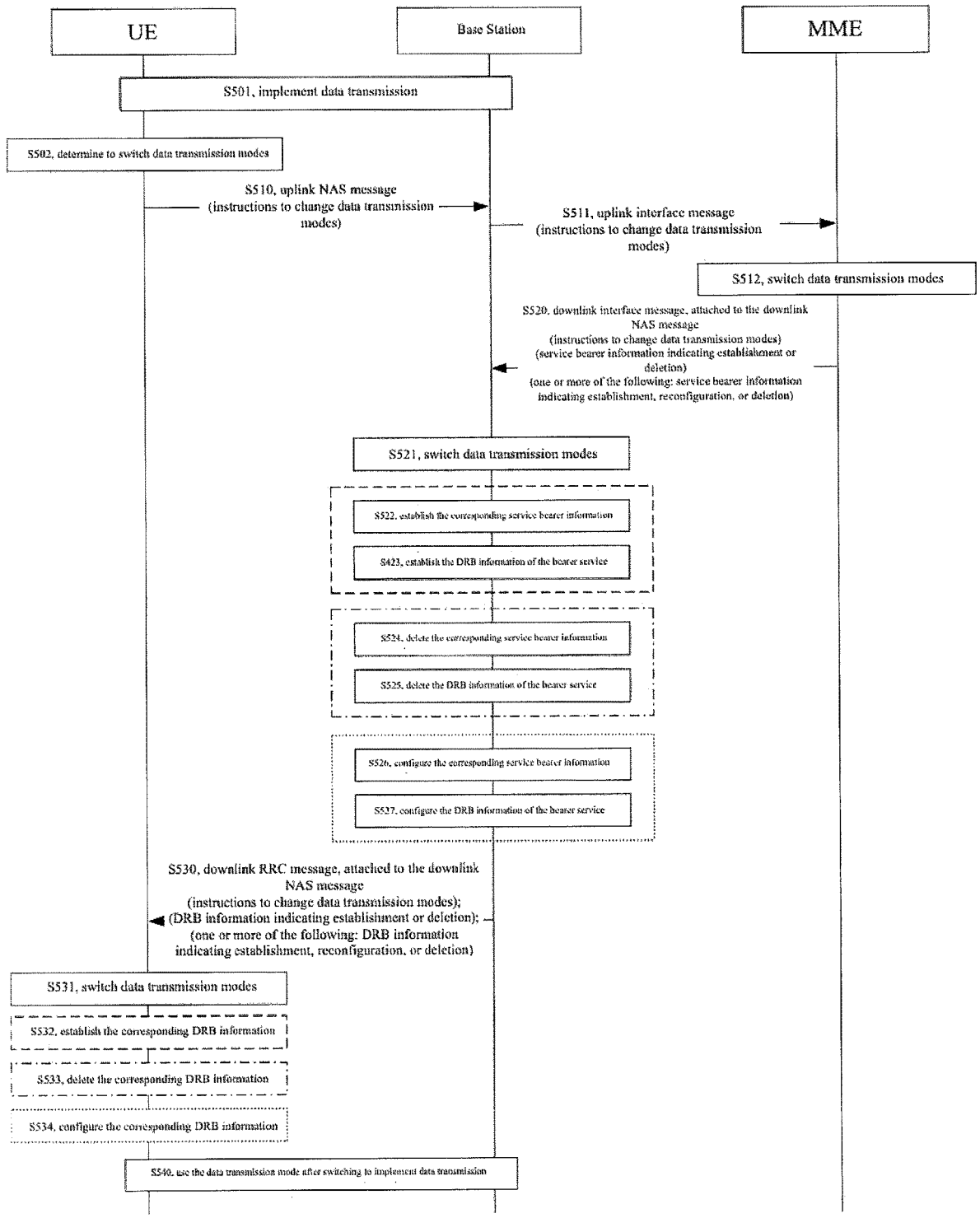
FIG. 11 is another signaling interaction flowchart of the data transmission methods provided by the embodiments of the present disclosure.

FIG. 11 is another signaling interaction flowchart of the data transmission methods provided by the embodiments of the present disclosure. The data transmission method of the present embodiment is suitable for implementing data transmission for different service type scenarios; the methods can be executed by the UE, the base station, and the MME. The present embodiment uses, as an illustrative example, the UE instructing for data transmission mode-switching through the uplink NAS message. As FIG. 11 shows, the method of the present embodiment can comprise:

in S510, the UE transmitting the uplink NAS message carrying instructions to switch data transmission modes to the base station, wherein the data transmission modes comprise the CP mode, the UP mode, and/or the LTE mode;

in S511, the base station transmitting the uplink interface message carrying instructions to change data transmission modes to the MME; the uplink interface message of the present embodiment can be an uplink S1 interface message or an added S1 interface message;

in S512, the MME switching data transmission modes according to the data transmission mode-switch instructions;

in S520, the MME transmitting the downlink interface message carrying data transmission mode-switch instructions to the base station; the downlink interface message of the present embodiment can be a downlink S1 interface or an added downlink S1 interface message;

in S521, the base station switching data transmission modes according to the instructions to change data transmission modes;

in S530, the base station transmitting the downlink RRC message carrying instructions to switch data transmission modes to the UE;

in S531, the UE switching data transmission modes based on the data transmission mode-switch instructions;

in S540, the UE using the data transmission mode after switching to implement data transmission.

Within the present embodiment, the downlink NAS message can be attached to the downlink interface message of S520 and the downlink RRC message of S530; the downlink NAS message also includes instructions to change data transmission modes; the downlink NAS message is transmitted from the MME to the UE through the base station.

Before S510, the data transmission method of the present embodiment further comprises:

in S501, the UE implementing data transmission with the base station through the Attach procedure; the UE storing the support circumstances of the base station and the MME for the data transmission mode;

in S502, the UE determining to switch data transmission modes according to the present service type. The triggering conditions of the present embodiment for the UE to switch data transmission modes are the same as those of the foregoing embodiments, and will not be discussed further here;

in an application scenario of the present embodiments, the data transmission mode after switching is the UP mode or the LTE mode, and the data transmission mode before switching is the CP mode; the downlink interface message transmitted by the MME of S520 of the present embodiment further comprises service bearer information indicating establishment; correspondingly, after S521, the embodiment further comprises:

in S522, the base station establishing the corresponding service bearer information according to the service bearer information indicating establishment.

Alternatively, the present embodiment further comprises: in S523, the base station establishing DRB information of the bearer service according to the data transmission mode after switching. Correspondingly, the downlink RRC message transmitted from the base station to the UE in S530 further comprises DRB information indicating establishment; after S531, the present embodiment further comprises:

in S532, the UE establishes the corresponding DRB information based on the DRB information indicating establishment.

In another application scenario of the present embodiment, the data transmission mode after switching is the CP mode; the downlink interface message transmitted by the MME in S520 of the present embodiment further comprises service bearer information indicating deletion; correspondingly, after S521, the present embodiment further comprises:

in S524, the base station deleting the corresponding service bearer information based on the service bearer information indicating deletion.

Alternatively, the present embodiment further comprises: in S525, the base station deleting DRB information of the bearer service according to the data transmission mode after switching. Correspondingly, in S530, the downlink RRC message transmitted from the base station to the UE further comprises DRB information indicating deletion. After S521, the present embodiment further comprises:

In S533, the UE deleting the corresponding DRB information based on the DRB information indicating deletion.

In another application scenario of the present embodiment, the data transmission mode after switching is the UP mode, and the data transmission mode before switching is the LTE mode; or, the data transmission mode after switching is the LTE mode, and the data transmission mode before switching is the UP mode; the downlink interface message transmitted by the MME in S520 of the present embodiment further comprises one or more of the following: service bearer information indicating establishment, service bearer information indicating reconfiguration, and service bearer information indicating deletion; correspondingly, after S521, the present embodiment further comprises:

In S526, the base station configuring the corresponding service bearer information based on the content of the downlink interface message.

Alternatively, the present embodiment further comprises: in S527, the base station configuring DRB information of the bearer service according to the data transmission mode after switching. Correspondingly, in S530, the downlink RRC message transmitted from the base station to the UE further comprises one or more of the following: DRB information indicating establishment, DRB information indicating reconfiguration, and DRB information indicating deletion. After S521, the present embodiment further comprises:

in S534, the UE configuring the corresponding DRB information based on the content of the downlink RRC message.

The type of uplink NAS message, uplink interface message, downlink interface message, downlink RRC message, and downlink NAS message of the present embodiment is the same as those of the foregoing embodiments, and will not be discussed further here.

In the embodiments illustrated by FIG. 10 and FIG. 11 and described above, the form of the data transmission mode-switch instructions can also be diversified, such as the data transmission mode-switch instructions comprising the target data transmission mode to be switched to; or, for example, the data transmission mode-switch instructions comprising a Bitmap used for instructing to switch to the target data transmission mode; as another example, the data transmission mode-switch instructions can comprise the reason for switching data transmission modes, such as through indicating that the present data transmission mode is unavailable.

Within the present embodiment, the UE notifies the base station with the uplink RRC message in order to instruct the UE to switch data transmission modes; wherein, methods for instructing the UE to switch data transmission modes can be: adding an instruction cell to the uplink RRC message for the UE to switch data transmission modes; the uplink RRC message can also be any of the following types of messages: RRC Connection Request messages, RRC Connection Setup Complete messages, RRC Connection Reestablishment Requests, RRC Connection Reestablishment Complete messages, Uplink Information Transfer messages, UE Information response messages, and added uplink air interface messages, etc.

The UE uses the uplink NAS message to notify the MME in order to instruct the UE to switch data transmission modes, wherein, methods for instructing the UE to switch data transmission modes can be: adding an instruction cell to the uplink NAS message for the UE to switch data transmission modes, or adding a data transmission mode cell to which the desired switch is made; the uplink NAS message can be any of the following message types: Initial Context Setup Response messages, Initial Context Setup Failure messages, UE Context Release Request messages, UE Context Modification Failure messages, Initial UE Messages, Uplink NAS Transfer messages, NAS Non Delivery Indication messages, and other added uplink NAS messages, etc.

MME uses the downlink interface message to notify the base station to instruct the UE to switch data transmission modes, wherein, methods for instructing the UE to switch data transmission modes can be: adding an instruction cell to the downlink interface message for the UE to switch data transmission modes, or adding a release reason; the downlink interface message can be any of the following message types: Initial Context Setup Request messages, UE Context Release Command messages, UE Context Release Complete messages, UE Context Modification Request messages, Downlink NAS Transfer messages, Paging messages, E-RAB Setup Request messages, E-RAB Modify Request messages, E-RAB Release Command messages, UP mode added recovery information, suspended messages, and other added downlink interface messages, etc.

The base station uses the downlink RRC message to notify the UE to instruct the UE to switch data transmission modes, wherein, methods for instructing the UE to switch data transmission modes can be: adding an instruction cell to the downlink RRC message for the UE to switch data transmission modes; the downlink RRC message can be any of the following message types: RRC Connection Setup messages, RRC Connection Reconfiguration messages, RRC Connection Reestablishment messages, RRC Connection Reestablishment Reject messages, RRC Connection Reject messages, RRC Connection Release messages, Downlink Information Transfer messages, Paging messages, UE Information Request messages, and added downlink air interface messages, etc.

Figure 12:
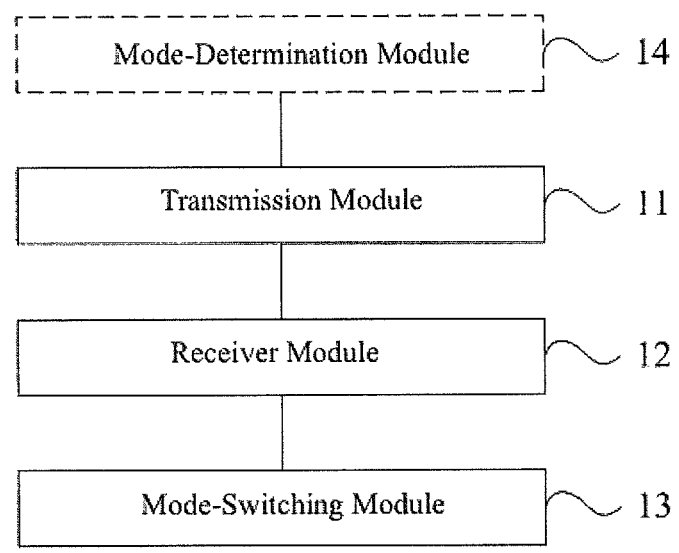
FIG. 12 is a schematic diagram of the data transmission apparatus provided by the embodiments of the present disclosure.

FIG. 12 is a schematic diagram of the data transmission apparatus provided by the embodiments of the present disclosure. The data transmission apparatus provided by the present embodiments is suitable for implementing data transmission for different service type scenarios; the data transmission apparatus are implemented using a combination of hardware and software, and can be integrated on a UE processor for the processor's use. As shown in FIG. 12, the data transmission apparatus of the present embodiment comprises: transmission module 11, receiver module 12, and mode-switching module 13.

Wherein, the transmission module 11 is configured to be able to transmit the uplink interface message to the MME through the base station; the uplink interface message includes instructions to switch data transmission modes; the data transmission modes comprise the Control Plane (CP) mode, the User Plane (UP) mode, and/or the Long-Term Evolution (LTE) mode.

The data transmission apparatus of the embodiment of the present disclosure are multiple data transmission modes (i.e., the CP mode, the UP mode, and the LTE mode) configured for the UE and the network-side; for the data transmission apparatus provided by the present embodiments, before the transmission module 11 has transmitted the uplink interface message, the UE has already interacted with the base station about information related to the data transmission mode using the Attach procedure, and the UE and the network-side network element have stored whether or not the CP mode, the UP mode, or the LTE mode is supported. Within the present embodiment, when the UE detects that the service type has changed, and that the present data transmission mode is not suitable for the QoS requirements of the new service type, the UE can actively initiate a request to switch data transmission modes; that is, the UE transmits the uplink interface message carrying instructions to switch data transmission modes to the MME through the base station; the uplink interface message is used to instruct the network-side to switch data transmission modes.

The form of the data transmission mode-switching, the triggering conditions for the UE to initiate mode switching, the UE types, and the data transmission modes supported by the network element of the present embodiment have all been described in the foregoing embodiments and will not be discussed further here.

The receiver module 12, which is connected to the transmission module 11, is configured to be able to receive the downlink Radio Resource Control (RRC) message transmitted by the base station; the downlink RRC message also includes instructions to change data transmission modes.

Within the present embodiment, after receiving the uplink interface message carrying instructions to change data transmission modes, the MME can implement data transmission mode-switching based on the instructions to change data transmission modes; the MME can then transmit the downlink interface message carrying instructions to change data transmission modes on the S1 interface to the base station; the base station can perform the data transmission mode-switch operation based on the instructions to change data transmission modes of the downlink interface message; after switching data transmission modes, the base station can transmit the downlink RRC message comprising instructions to change data transmission modes to the UE.

The mode-switching module 13, which is connected to the receiver module 12, is configured to be able to switch data transmission modes according to the instructions to change data transmission modes received by the receiver module 12.

The transmission module 11 and the receiver module 12 are further configured to be able to use the data transmission mode that the mode-switching module 13 has switched to for data transmission.

Within the present embodiment, after receiving the downlink RRC message transmitted by the base station, the receiver module 12 can instruct the mode-switching module 13 to perform the data transmission mode-switch operation, thereby completing the data transmission mode switch; subsequently the UE, through the transmission module 11 and the receiver module 12, implements data transmission with the network-side according to the data transmission mode after switching, wherein the data transmission mode after switching is the data transmission mode suitable for the present service type.

The present embodiment does not limit the data transmission modes supported by the UE, the base station, and the MME, which can support two of them or all of them; as long as the base station and the MME both support the data transmission mode, switching to that mode can be implemented; within the present embodiment, the transmission module 11 and the receiver module 12 are further configured to be able to use the Attach procedure to carry out data transmission with the base station before the transmission module 11 transmits the uplink interface message to the MME through the base station. The UE stores the data transmission mode support situations for the base station and the MME; correspondingly, the data transmission apparatus provided by the present embodiment further comprises: the mode-determination module 14, which is connected with the transmission module 11, configured to be able to determine to switch data transmission modes based on the present service type.

The data transmission apparatus of the present embodiment is configured to execute the data transmission method provided by the embodiment illustrated in FIG. 1, and has corresponding functional modules; the principles of implementation and the technical results are similar, and will not be discussed further here.

Figure 13:
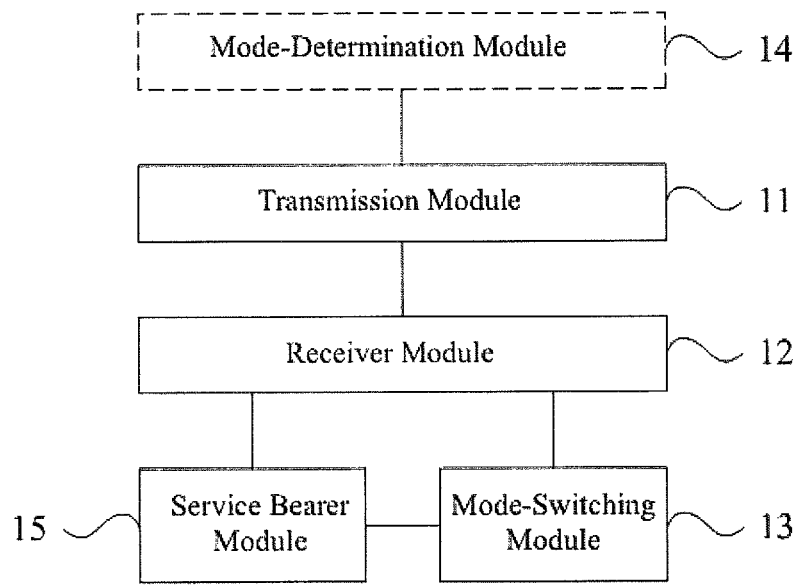
FIG. 13 is another schematic diagram of the data transmission apparatus provided by the embodiments of the present disclosure.

Alternatively, the data transmission mode after switching of the present embodiment is the UP mode or the LTE mode, and the data transmission mode before switching is the CP mode; correspondingly, the downlink RRC message received by the receiver module 12 further comprises DRB information indicating establishment, as shown in FIG. 13, which is a schematic diagram of another data transmission apparatus provided by the present embodiments; on the basis of the structure of the apparatus illustrated in FIG. 12, the data transmission apparatus of the present embodiment further comprises: the service bearer module 15, connected to the receiver module 12 and the mode-switching module 13, respectively, configured to be able to establish the corresponding DRB information based on the DRB information indicating establishment received by the receiver module 12 after the mode-switching module 13 has switched data transmission modes based on the data transmission mode-switch instructions received by the receiver module 12.

Alternatively, the data transmission mode after switching of the present embodiment is the CP mode; correspondingly, the downlink RRC message received by the receiver module 12 can further comprise DRB information indicating deletion; the embodiment can be executed by the apparatus shown in FIG. 13 and described above.

The downlink RRC message received by the receiver module 12 can further comprise DRB information indicating deletion; the present embodiment can be executed by the apparatus illustrated by FIG. 13 and described above; the service bearer module 15 can be further configured to be able to delete the corresponding DRB information according to the DRB information indicating deletion received by the receiver module 12 after the mode-switching module 13 has switched the data transmission mode based on the instructions to change data transmission modes received by the receiver module 12. In the implementation of the present embodiment, the network-side may not initiate the related process of deleting the bearer service, that is, the MME and the base station do not need to delete the service bearer information, and the base station and the UE do not need to delete the DRB information of the bearer service.

Alternatively, the data transmission mode after switching of the present embodiment is the UP mode, and the data transmission mode before switching is the LTE mode; or, the data transmission mode after switching is the LTE mode, and the data transmission mode before switching is the UP mode; correspondingly, the downlink RRC message received by the receiver module 12 further comprises one or more of the following: DRB information indicating establishment, DRB information indicating reconfiguration, and DRB information indicating deletion. The present embodiment can also be executed by the apparatus illustrated in FIG. 13 and described above; the service bearer module 15 is further set up to configure the corresponding DRB information according to the content of the downlink RRC message received by the receiver module 12 after the mode-switching module has switched the data transmission mode according to the instructions to change data transmission modes received by the receiver module 12. In the implementation of the present embodiment; the network-side may not initiate the related process of reconfiguring the bearer service, that is, the MME and the base station do not need to reconfigure the service bearer information, and the base station and the UE do not need to reconfigure the DRB information of the bearer service.

The data transmission apparatus provided by the present embodiment is used to execute the data transmission method provided by the embodiment illustrated by FIG. 2, and has corresponding functional modules; the principles of implementation and the technical results are similar, and will not be discussed further here.

Within the present embodiment, the UE can instruct to implement data transmission mode-switching through the uplink RRC message, and can further instruct to implement data transmission mode-switching through the uplink NAS message. Alternate embodiments are used for explanation below.

Alternatively, within the present embodiment, the UE instructs for data transmission mode-switching using the uplink RRC message; the present embodiment can be implemented using the apparatus illustrated by FIG. 12 or FIG. 13; in implementation, the transmission module 11 is configured to be able to transmit the uplink interface message to the MME through the base station, and comprises: configuration to be able to transmit the uplink RRC message carrying instructions to change data transmission modes to the base station; the uplink RRC message is used to instruct the base station to transmit the uplink interface message to the MME; correspondingly, the downlink RRC message received by the receiver module 12 is transmitted to the UE after the base station switches data transmission modes based on the received downlink interface message; the downlink interface message includes instructions to switch data transmission modes. Within the present embodiment, the type of uplink RRC message, uplink interface message, and downlink RRC message are the same as those of the foregoing embodiments, and will not be discussed further here.

The data transmission apparatus provided by the present embodiment is used to execute the data transmission method provided by the embodiment illustrated by FIG. 3 of the present disclosure, and has corresponding functional modules; the principles of implementation and the technical results are similar, and will not be discussed further here.

Alternatively, within the present embodiment, the UE instructs for the implementation of data transmission mode-switching using the uplink NAS message; the present embodiment is also executed by the apparatus illustrated by FIG. 12 or FIG. 13; in implementation, the transmission module 11 is configured to be able to transmit the uplink interface message to the MME through the base station, which comprises: configuration to transmit the uplink non-access stratum (NAS) message carrying instructions to change data transmission modes to the base station; the uplink NAS message is used to instruct the base station to transmit the uplink interface message to the MME; correspondingly, the downlink RRC message received by the receiver module 12 is transmitted to the UE after the base station switches data transmission modes based on the received downlink interface message; the downlink NAS message is attached to the downlink interface message and the downlink RRC message; the downlink NAS message also includes instructions to change data transmission modes. Within the present embodiment, the type of uplink NAS message, downlink interfaces message, and downlink RRC message are the same as those of the foregoing embodiments, and will not be described further here.

The data transmission apparatus of the present embodiment is used to execute the data transmission methods provided by the embodiment illustrated in FIG. 4 of the present disclosure, and has corresponding functional modules; the principles of implementation and the technical results are similar, and will not be discussed further here.

For the data transmission apparatus of the embodiment of the present disclosure, the form of the instructions to change data transmission modes can be diversified, such as the data transmission mode-switch instructions comprising the target data transmission mode to be switched to; or, for example, the data transmission mode-switch instructions comprising a Bitmap used for instructing to switch to the target data transmission mode; as another example, the data transmission mode-switch instructions can comprise the reason for switching data transmission modes, such as through indicating that the present data transmission mode is unavailable.

In the process of implementation, the transmission module 11 and the receiver module 12 of the embodiments illustrated by FIG. 12 and FIG. 13 can be implemented by the transceiver of the UE; the mode-switching module 13, the mode-determination module 14, and the service bearer module 15 can be implemented by the processor of the UE, wherein the processor could, for example, be a Central Processing Unit (CPU), or an Application Specific Integrated Circuit (ASIC), or one or more integrated circuits used to carry out the embodiments of the present disclosure.

Figure 14:
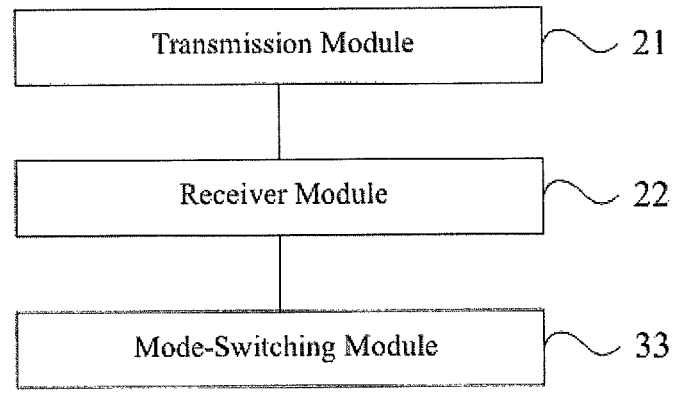
FIG. 14 is another schematic diagram of the data transmission apparatus provided by the embodiments of the present disclosure.

FIG. 14 is another schematic diagram of the data transmission apparatus provided by the embodiments of the present disclosure; the data transmission apparatus provided by the present embodiment is suitable for implementing data transmission for different service type scenarios, and is implemented using a combination of hardware and software; the apparatus can be integrated onto a base station processor for the processor's use. As FIG. 14 shows, the data transmission apparatus of the present embodiments comprise the transmission module 21, the receiver module 22, and the mode-switching module 23.

Wherein, the transmission module 12 is configured to be able to transmit the uplink interface message to the MME; the uplink interface message includes instructions to switch data transmission modes, wherein the data transmission modes comprise the CP mode, the UP mode, and/or the LTE mode.

The data transmission apparatus provided by the present embodiment are multiple data transmission modes (that is, the CP mode, the UP mode, and the LTE mode) configured for the base station and other network elements; for the data transmission apparatus provided by the present embodiment, the UE has interacted with the base station about information related to the data transmission mode using the Attach procedure before the transmission module 12 has transmitted the uplink interface message. Within the present embodiment, when the UE detects that the service type has changed, and that the present data transmission mode is not suitable for the QoS requirements of the new service type, the UE can actively initiate a data transmission mode-switch request; that is, the base station receives the uplink RRC message carrying instructions to change data transmission modes transmitted by the UE, thereby instructing the base station to transmit the uplink interface message carrying instructions to change data transmission modes to the MME; the base station and the MME can change data transmission modes according to this information.

The form of the data transmission mode-switching, the triggering conditions for the UE to initiate mode switching, the UE types, and the data transmission modes supported by the network element of the present embodiment have all been described in the foregoing embodiments and will not be discussed further here.

The receiver module 22, which is connected to the transmission module 21, is configured to be able to receive the downlink interface message transmitted by the MME; the downlink interface message also comprises instructions to switch data transmission modes.

The mode-switching 23, which is connected to the receiver module 22, is configured to be able switch data transmission modes according to the data transmission mode-switch instructions received by the receiver module 21.

Within the present embodiment, after the transmission module 21 has transmitted the uplink interface message to the MME, the MME can switch data transmission modes based on the instructions to change data transmission modes of the uplink interface message; the MME can then transmit the downlink interface message carrying instructions to change data transmission modes on the S1 interface to the base station; after the receiver module 22 receives the downlink interface message, it can implement the data transmission mode-switch operation.

The transmission module 21 is further configured to be able to transmit the downlink RRC message to the UE; the downlink RRC message also includes instructions to switch data transmission modes.

Within the present embodiment, after the mode-switching module 23 executes the data transmission mode-switch operation, the transmission module 21 can transmit the downlink RRC message carrying instructions to switch data transmission modes to the UE, thereby completing the data transmission mode-switch process; whereupon the base station, the UE, and the MME implement data transmission according to the data transmission mode after switching, wherein the data transmission mode after switching is the data transmission mode suitable for the present service type.

The data transmission apparatus of the present embodiment is used to execute the data transmission method provided by the embodiment illustrated in FIG. 5 of the present disclosure, and has corresponding functional modules; the principles of implementation and the technical results are similar, and will not be discussed further here.

Figure 15:
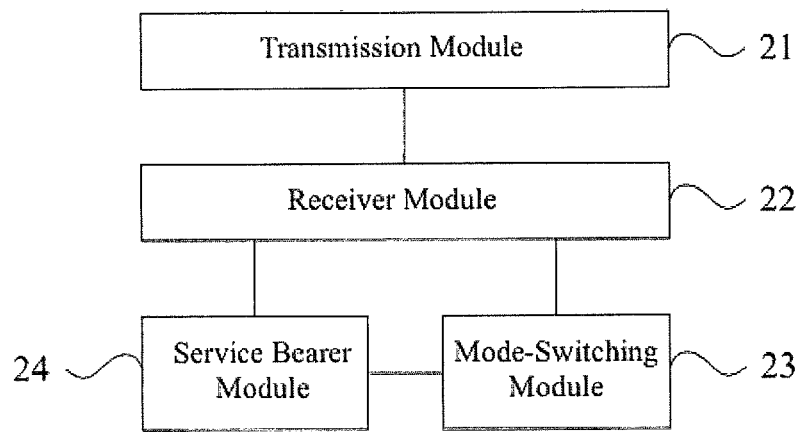
FIG. 15 is another schematic diagram of the data transmission apparatus provided by the embodiments of the present disclosure.

Alternatively, the data transmission mode after switching of the present embodiment is the UP mode or the LTE mode, and the data transmission mode before switching is the CP mode; correspondingly, the downlink interface message received by the receive module 22 further comprises service bearer information indicating establishment. As shown in FIG. 15, a schematic diagram of another data transmission apparatus of the present embodiment based on the apparatus illustrated by FIG. 14, the data transmission apparatus of the present embodiment further comprises: the service bearer module 24 connected to the receiver module and the mode-switching module 23, respectively, and is configured to establish the corresponding service bearer information based on the service bearer information indicating establishment received by the receiver module 22 after the mode-switching module 23 has switched data transmission modes based on the data transmission mode-switch instructions received by the receiver module 22.

Alternatively, the service bearer module 24 of the present embodiment is further configured to be able to establish the Data Radio Bearer (DRB) message according to the data transmission mode the mode-switching module 23 has switched to after the mode-switching module 23 has switched data transmission modes based on the instructions to change data transmission modes received by the receiver module 22; correspondingly, the downlink RRC message transmitted by the transmission module 21 further comprises DRB information indicating establishment.

Alternatively, the data transmission mode after switching of the present embodiment is the CP mode; correspondingly, the downlink interface message received by the receiver module 22 further comprises service bearer information indicating deletion; the present embodiment can be implemented with the apparatus illustrated by FIG. 15; the service bearer module 24 is further configured to be able to delete the corresponding service bearer information according to the service bearer information indicating deletion received by the receiver module 22 after the mode-switching module 23 has switched data transmission modes according to the instructions to change data transmission modes received by the receiver module 22.

Alternatively, the service bearer module 24 of the present embodiment is further configured to delete DRB information of the bearer service according to the data transmission mode the mode-switching module 23 has switched to after the mode-switching mode 23 has switched data transmission modes based on the instructions to change data transmission modes received by the receiver module 22.

Correspondingly, the downlink RRC message transmitted by the transmission module 21 further comprises DRB information indicating deletion. In the implementation of the present embodiment, the network-side may not initiate the related process of deleting the bearer service, that is, the MME and the base station do not need to delete the service bearer information, and the base station and the UE do not need to delete the DRB information of the bearer service.

Alternatively, the data transmission mode after switching of the present embodiment is the UP mode, and the data transmission mode before switching is the LTE mode; or, the data transmission mode after switching is the LTE mode, and the data transmission mode before switching is the UP mode; correspondingly, the downlink interface message received by the receiver module 22 further comprises one or more of the following: service bearer information indicating establishment, service bearer information indicating reconfiguration, and service bearer information indicating deletion; the present embodiment can also be executed using the apparatus illustrated in FIG. 15; the service bearer module 24 is further configured to be able to configure the corresponding service bearer information based on the content of the downlink interface received by the receiver module 22 after the mode-switching module 23 has switched data transmission modes based on the data transmission mode-switch instructions received by the receiver module 22.

Alternatively, the service bearer module 24 of the present embodiment is further set up to configure DRB information of the bearer service based on the data transmission mode the mode-switching module has switched to after the mode-switching module has switched data transmission modes based on the instructions to change data transmission modes received by the receiver module 22.

Correspondingly, the downlink RRC message transmitted by the transmission module 21 further comprises one or more of the following: DRB information indicating establishment, DRB information indicating reconfiguration, and DRB information indicating deletion. In the implementation of the present embodiment, the network-side may not initiate the related process of reconfiguring the bearer service, that is, the MME and the base station do not need to reconfigure the service bearer information, and the base station and the UE do not need to reconfigure the DRB information of the bearer service.

The data transmission apparatus of the present embodiment is used to execute the data transmission method provided by the embodiment illustrated in FIG. 6 of the present disclosure, and has corresponding functional modules; the principles of implementation and the technical results are similar, and will not be discussed further here.

Within the present embodiment, the UE can instruct to implement data transmission mode-switching through the uplink RRC message, and can further instruct to implement data transmission mode-switching through the uplink NAS message. Alternate embodiments are used for explanation below.

Alternatively, within the present embodiment, the UE instructs for data transmission mode-switching using the uplink RRC message; the present embodiment can be executed by the apparatus illustrated in FIG. 14 or FIG. 15. In the process of implementation, the transmission module 21 is configured to be able to transmit the uplink interface message to the MME, which comprises: configuration to be able to transmit the uplink interface message to the MME according to the uplink RRC message received by the receiver module; the uplink RRC message includes instructions to change data transmission modes, wherein the data transmission mode-switch instructions are added to the uplink RRC message after the UE determines to switch data transmission modes based on the present service type; correspondingly, the downlink interface message received by the receiver module 22 is transmitted to the base station after the MME switches data transmission modes according to the data transmission mode-switch instructions. Within the present embodiment, the type of uplink RRC message, uplink interface message, and downlink RRC message are the same as those of the foregoing embodiments, and will not be discussed further here.

The data transmission apparatus of the present embodiment is used to execute the data transmission method provided by the embodiment illustrated by FIG. 7 of the present disclosure, and has corresponding functional modules; the principles of implementation and the technical results are similar, and will not be discussed further here.

Alternatively, within the present embodiment, the UE instructs for the implementation of data transmission mode-switching using the uplink NAS message; the present embodiment can also be executed by the apparatus illustrated by FIG. 14 or FIG. 15. In the process of implementation, the transmission module 21 is configured to be able to transmit the uplink interface message to the MME, which comprises: configuration to be able to transmit the uplink interface message to the MME based on the uplink NAS message received by the receiver module 22. The uplink NAS message comprises instructions to switch data transmission modes; the instructions to change data transmission modes are added to the NAS message after the UE determines to switch data transmission modes based on the present service type; correspondingly, the downlink interface message received by the receiver module 22 is transmitted to the base station after the MME switches data transmission modes according to the data transmission mode-switch instructions; the downlink NAS message is attached to the downlink access message and the downlink RRC message; the downlink NAS message also includes instructions to change data transmission modes. Within the present embodiment, the type of uplink NAS message, downlink access message, and downlink RRC message is the same as those in the foregoing embodiments, and thus will not be discussed further here.

The data transmission apparatus of the present embodiment is used to execute the data transmission method provided by the embodiment illustrated in FIG. 8 of the present disclosure, and has corresponding functional modules; the principles of implementation and the technical results are similar, and will not be discussed further here.

For the data transmission apparatus of present embodiment, the form of the data transmission mode-switch instructions can also be diversified, such as the data transmission mode-switch instructions comprising the target data transmission mode to be switched to; or, for example, the data transmission mode-switch instructions comprising a Bitmap used for instructing to switch to the target data transmission mode; as another example, the data transmission mode-switch instructions can comprise the reason for switching data transmission modes, such as through indicating that the present data transmission mode is unavailable.

In the process of implementation, the transmission module 21 and the receiver module 22 of the embodiment illustrated by FIG. 14 and FIG. 15 of the present disclosure can be implemented with the transceiver of the base station; the mode-switching module 23 and the service bearer module 24 can be implemented with the processor of the base station, wherein the processor can also be, for example, a CPU, an ASIC, or one or more integrated circuits that can carry out the embodiments of the present disclosure.

Figure 16:
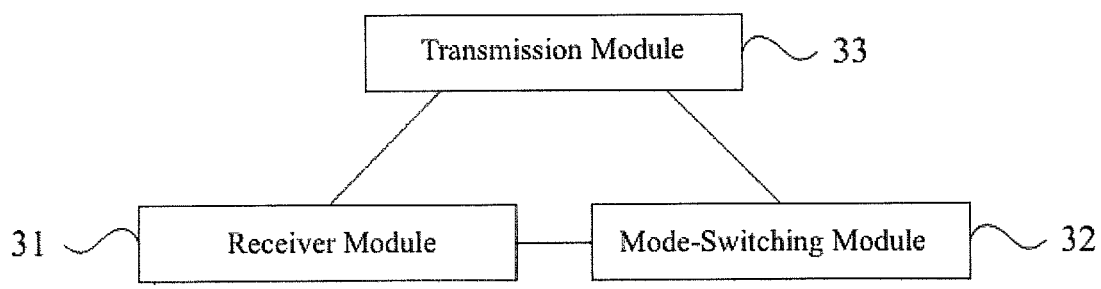
FIG. 16 is another schematic diagram of the data transmission apparatus provided by the embodiments of the present disclosure.

FIG. 16 is another schematic diagram of the data transmission apparatus provided by the embodiments of the present disclosure. The data transmission apparatus provided by the present embodiment is suitable for implementing data transmission for different service type scenarios; the data transmission apparatus are implemented using a combination of hardware and software, and can be integrated onto an MME processor for the processor's use. As FIG. 16 shows, the data transmission apparatus of the present embodiment can comprise the receiver module 31, the mode-switching module 32, and the transmission module 33;

wherein, the receiver module 31 is configured to be able to receive the uplink interface message transmitted by the base station; the uplink interface message includes instructions to switch data transmission modes, and the data transmission modes comprise the Control Plane (CP) mode, the User Plane (UP) mode, and/or the Long-Term Evolution (LTE) mode.

The data transmission apparatus provided by the present embodiment are various data transmission modes (i.e., the CP mode, the UP mode, and the LTE mode) configured for the MME and other network elements. For the data transmission apparatus provided by the present embodiment, before the receiver module 31 receives the uplink interface message, the UE has already interacted with the base station about information related to the data transmission mode using the Attach procedure. Within the present embodiment, when the UE detects that the service type has changed, and that the present data transmission mode is not suitable for the QoS requirements of the new service type, the UE can actively initiate a data transmission mode-switch request; that is, the receiver module 31 can receive the uplink interface message carrying instructions to change data transmission modes sent by the base station; the MME and the base station can switch data transmission modes based on this information.

The form of the data transmission mode-switching, the triggering conditions for the UE to initiate mode switching, the UE types, and the data transmission modes supported by the network element of the present embodiment have all been described in the foregoing embodiments, and will not be discussed further here.

The mode-switching module 32, which is connected to the receiver module 31, is configured to be able to switch data transmission modes according to the data transmission mode-switch instructions received by the receiver module 31.

The transmission module 33, connected to the receiver module 31 and the mode-switching module 32, respectively, is configured to be able to transmit the downlink interface message to the base station, wherein the downlink interface message includes instructions to switch data transmission modes.

Within the present embodiment, after receiving the uplink interface message carrying the data transmission mode-switch instructions transmitted by the UE through the base station, the receiver module 31 can instruct the mode-switching module 32 to switch data transmission modes according to the data transmission mode-switch instructions; the transmission module 33 transmits the downlink interface message carrying instructions to change data transmission modes to the base station on the S1 interface in order to indicate to the base station that it can execute the mode-switch operation; the base station can then proceed to instruct the UE to perform the mode-switch operation, thereby completing the data transmission mode-switch process; that is, between the MME and the base station, and the UE and the network-side data transmission is implemented according to the data transmission mode after switching, wherein the data transmission mode after switching is the data transmission mode suitable for the present service type.

The data transmission apparatus of the present embodiment is used to execute the data transmission method provided by the embodiment illustrated in FIG. 9 of the present disclosure, and has corresponding functional modules; the principles of implementation and technical results are similar, and will not be discussed further here.

Alternatively, the data transmission mode after switching of the present embodiment is the UP mode or the LTE mode, and the data transmission mode before switching is the CP mode; correspondingly, within the data transmission apparatus provided by the present embodiment, the downlink interface message transmitted by the transmission module 33 can further comprise the service bearer information indicating establishment.

Alternatively, the data transmission mode after switching of the present embodiment is the CP mode; correspondingly, within the data transmission apparatus provided by the present embodiment, the downlink interface message transmitted by the transmission module 33 can further comprise the service bearer information indicating deletion. In the implementation of the present embodiment, the network-side may not initiate the related process of deleting the bearer service, that is, the MME and the base station do not need to delete the service bearer information, and the base station and the UE do not need to delete the DRB information of the bearer service.

Alternatively, the data transmission mode after switching of the present embodiment is the UP mode, and the data transmission mode before switching is the LTE mode; or, the data transmission mode after switching is the LTE mode, and the data transmission mode before switching is the UP mode; correspondingly, within the data transmission apparatus provided by the present embodiment, the downlink interface message transmitted by the transmission module 33 can further comprise one or more of the following:

service bearer information indicating establishment, service bearer information indicating reconfiguration, and service bearer information indicating deletion. In the implementation of the present embodiment, the network-side may not initiate the related process of deleting the bearer service, that is, the MME and the base station do not need to delete the service bearer information, and the base station and the UE do not need to delete the DRB information of the bearer service.

For present embodiment, the receiver module 31 can receive the mode-switching instructions from the uplink RRC message transmitted by the UE, and can also receive the mode-switching instructions from the uplink NAS message transmitted by the UE. The following makes use of alternate embodiments as a means for explanation.

Alternatively, the receiver module 31 of the present embodiment receives the mode-switching instructions from the uplink RRC message transmitted by the UE. The present embodiment can be executed by the apparatus illustrated in FIG. 16; in the process of implementation, the uplink interface message received by the receiver module 31 is transmitted to the MME after the base station receives the uplink RRC message, wherein the uplink RRC message includes instructions to change data transmission modes, and the data transmission mode-switch instructions are added to the uplink RRC message after the UE determines to switch data transmission modes based on the present service type. Within the present embodiment, the type of uplink RRC message, uplink interface message, downlink interface message, and downlink RRC message are the same as those of the foregoing embodiments, and will not be discussed further here.

Alternatively, the receiver module 31 of the present embodiment receives the mode-switching instructions from the uplink NAS message transmitted by the UE; the present embodiment can also be executed by the apparatus illustrated by FIG. 16 described above. In the process of implementation, the uplink interface message received by the receiver module 31 is transmitted to the MME after the base station receives the uplink NAS message, wherein the uplink NAS message includes instructions to switch data transmission modes; the instructions to change data transmission modes are added to the NAS message after the UE determines to switch data transmission modes based on the present service type; wherein, the downlink interface message transmitted by the transmission module 33 is used to instruct the base station to transmit the downlink RRC message carrying instructions to switch data transmission modes to the UE; the downlink NAS message is attached to the downlink interface message and the downlink RRC message, wherein the downlink NAS message includes instructions to change data transmission modes. Within the present embodiment, the type of uplink NAS message and uplink interface message are the same as those of the foregoing embodiments, and will not be discussed further here.

For the data transmission apparatus of the present embodiment, the form of the instructions to change data transmission modes can be diversified, such as the data transmission mode-switch instructions comprising the target data transmission mode to be switched to; or, for example, the data transmission mode-switch instructions comprising a Bitmap used for instructing to switch to the target data transmission mode; as another example, the data transmission mode-switch instructions can comprise the reason for switching data transmission modes, such as through indicating that the present data transmission mode is unavailable.

In the process of implementation, the transmission module 33 and the receiver module 31 of the embodiment illustrated by FIG. 16 of the present disclosure can be implemented with the MME transceiver; the mode-switching module 32 and the service bearer module 34 can be implemented with the MME processor, wherein the processor can also be, for example, a CPU, an ASIC, or one or more integrated circuits that can carry out the embodiments of the present disclosure.

Figure 17:
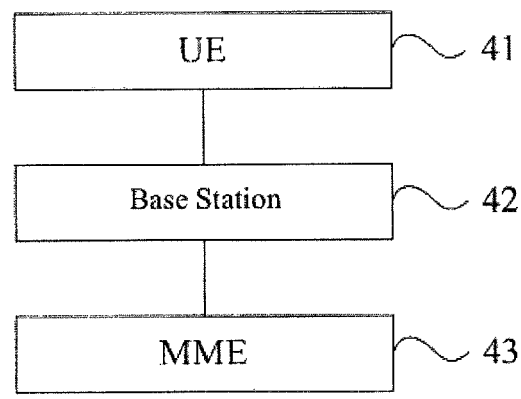
FIG. 17 is a schematic diagram of the data transmission system provided by the embodiments of the present disclosure.

FIG. 17 is a schematic diagram of the data transmission system provided by the embodiments of the present disclosure. The data transmission system of the present embodiments is suitable for implementing data transmission for different service type scenarios; the data transmission system comprises: the UE 41, the base station 42, and the MME 43; wherein, the UE 41 of the present embodiments is set up to have the data transmission apparatus of the embodiments illustrated by FIG. 12 and FIG. 13; the base station 42 of the present embodiments is set up to have the data transmission apparatus of the embodiments illustrated by FIG. 14 and FIG. 15; the MME 43 is set up to have the data transmission apparatus of the embodiment illustrated by FIG. 16. Within the data transmission system of the present embodiments, the network element's manner of data transmission is the same as the corresponding network elements in the embodiments illustrated by FIG. 12 through FIG. 16, and in the same way executes any of the data transmission methods provided by the embodiments of FIG. 1 through FIG. 11, and has a corresponding physical apparatus. The principles of implementation and the technical results are similar, and will not be discussed further here.

The embodiments of the present disclosure further provide a non-transitory computer-readable storage medium, storing computer-executable instructions; the computer-executable instructions are set up to execute any of the data transmission methods of the user equipment-side of the present disclosure.

The embodiments of the present disclosure further provide a non-transitory computer-readable storage medium, storing computer-executable instructions; the computer-executable instructions are set up to execute any of the data transmission methods of the base station-side of the present disclosure.

The embodiments of the present disclosure further provide a non-transitory computer-readable storage medium, storing computer-executable instructions; the computer-executable instructions are set up to execute any of the data transmission methods of the Mobile Management Entity-side of the present disclosure.

Figure 18:
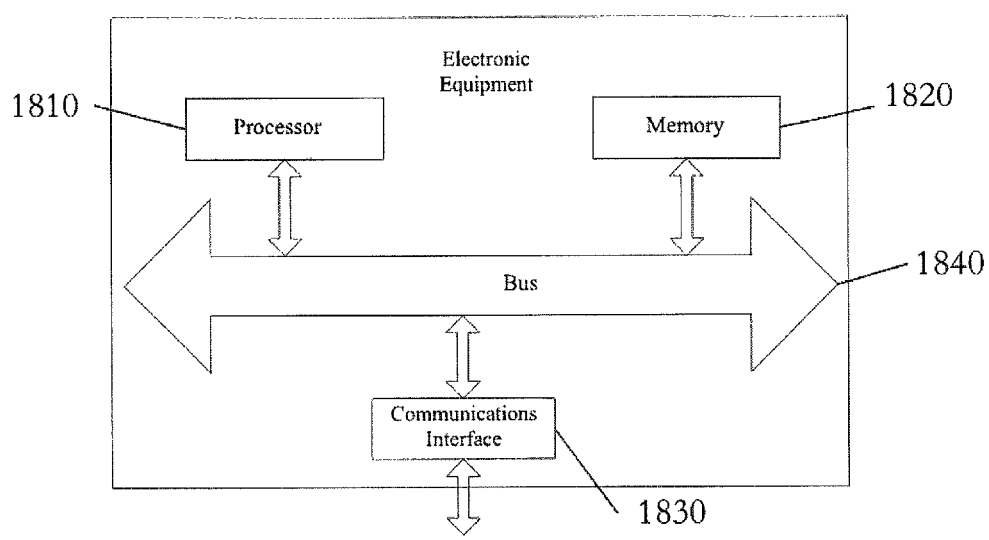
FIG. 18 is a schematic diagram of the User Equipment provided by the embodiments of the present disclosure.

The embodiments of the present disclosure further provide a schematic for the user equipment. With reference to FIG. 18, the user equipment comprises:

At least one processor 1810; FIG. 18, uses, as an example, one processor 1810; as well as the memory 1820, and can also comprise the Communications Interface 1830 and the Bus 1840, wherein, the processor 1810, the memory 1820, and the Communications Interface 1830 can communicate with each other through the Bus 1840; the Communications Interface 1830 can be used for information transmission; the processor 1810 can use the logic instructions on the memory 1820 in order to execute the data transmission methods of the user equipment-side of the present embodiments.

Besides this, the logic instructions on the memory 1820 can be implemented as software functional units, and when sold as independent products, can be stored on a computer-readable storage medium.

As a computer-readable storage medium, the memory 1820 can be used to store software programs, computer-executable programs, and modules, such as the programs/modules (e.g., the transmission module 11, the receiver module 12, and the mode-switching module 13 illustrated by FIG. 12) corresponding to the data transmission methods of the user-equipment-side executed in the embodiments of the present disclosure.

The processor 1810 runs the software programs, instructions, and modules stored in the memory 1820, thereby carrying out the functional applications and data processing, that is, implementing the data transmission methods of the user equipment-side of the present embodiments.

The memory 1820 can comprise a program storage area and a data storage area, wherein, the program storage area can store the operating system and at least one application program required by the function; the data transmission area can store data created according to terminal usage, etc. Beyond this, the memory 1820 can comprise high-speed random access memory, and can also comprise non-volatile memory.

The technical solutions of the embodiments of the present disclosure can take the form of computer software products stored in a storage medium, comprising one or more sets of instructions used to make one computer device (e.g., a personal computer, a server, or a network device, etc.) execute all of or a portion of the steps of the methods of the embodiments of the present disclosure. The computer storage medium can be a non-volatile storage medium, comprising a variety of storage mediums that can store program code such as a USB flash disk, a hard disk, Read-Only memory (ROM), Random Access Memory (RAM), a magnetic disk, or an optical disk; it can also be a transient storage medium.

Figure 19:
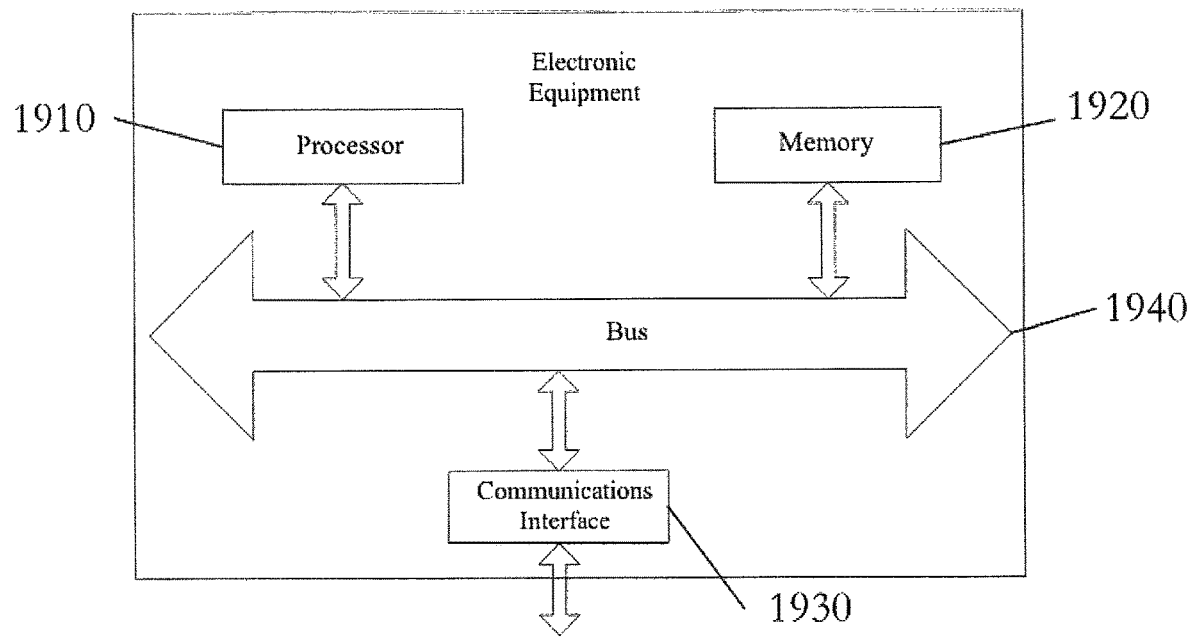
FIG. 19 is a schematic diagram of the base station provided by the embodiments of the present disclosure.

The embodiments of the present disclosure further provide a schematic for the base station. With reference to FIG. 19, the base station comprises:

At least one processor 1910; FIG. 19, uses, as an example, one processor 1910; as well as the memory 1920, and can also comprise the Communications Interface 1930 and the Bus 1940, wherein, the processor 1910, the memory 1920, and the Communications Interface 1930 can communicate with each other through the Bus 1940; the Communications Interface 1930 can be used for information transmission; the processor 1910 can use the logic instructions on the memory 1920 in order to execute the data transmission methods of the base station-side of the present embodiments.

Beyond this, the logic instructions of the memory 1920 can be implemented as software functional units, and when sold as independent products, can be stored on a computer-readable storage medium.

As a computer-readable storage medium, the memory 1920 can be used to store software programs, computer-executable programs, and modules, such as the programs/modules (e.g., the transmission module 21, the receiver module 22, and the mode-switching module 23 illustrated by FIG. 14) corresponding to the data transmission methods of the base station-side of the embodiments of the present disclosure.

The processor 1910 runs the software programs, instructions, and modules stored in the memory 1920, thereby carrying out the functional applications and data processing, that is, implementing the data transmission methods of the base station-side of the present embodiments.

The memory 1920 can comprise a program storage area and a data storage area, wherein, the program storage area can store the operating system and at least one application program required by the function; the data transmission area can store data created based on terminal usage, etc. Beyond this, the memory 1920 can comprise high-speed random access memory, and can also comprise non-volatile memory.

The technical solutions of the embodiments of the present disclosure can take the form of computer software products stored in a storage medium, comprising one or more sets of instructions used to to make one computer device (e.g., a personal computer, a server, or a network device, etc.) execute all of or a portion of the steps of the methods of the embodiments of the present disclosure. The computer storage medium can be a non-volatile storage medium, comprising a variety of storage mediums that can store program code such as a USB flash disk, a hard disk, Read-Only memory (ROM), Random Access Memory (RAM), a magnetic disk, or an optical disk; it can also be a transient storage medium.

Figure 20:
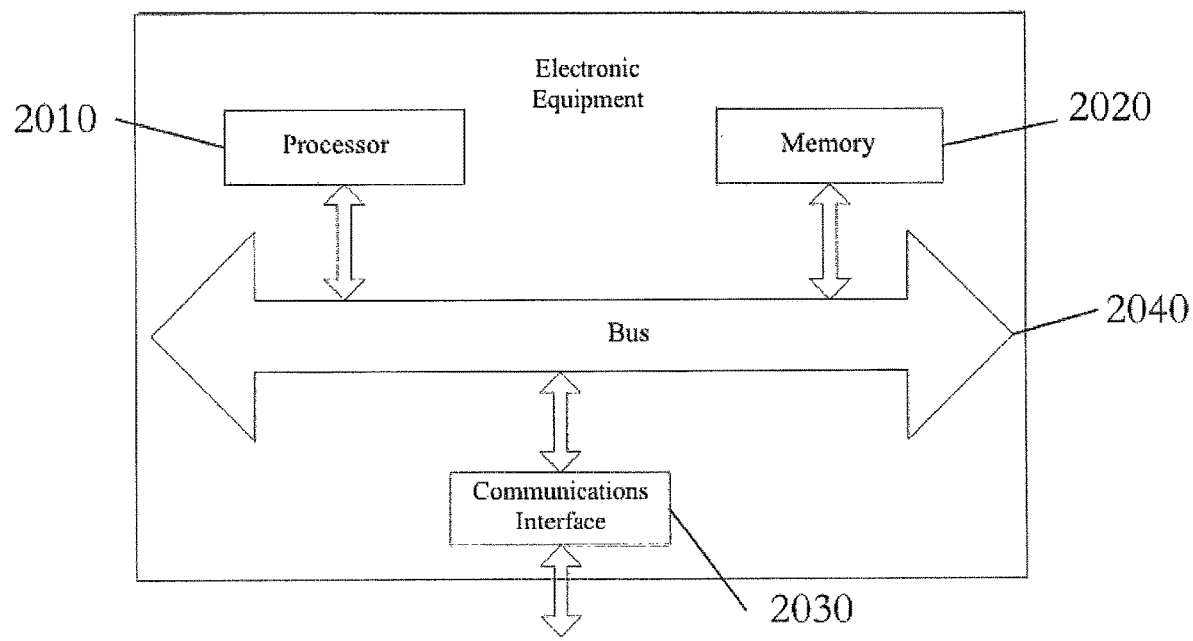
FIG. 20 is a schematic diagram of the Mobility Management Entity provided by the embodiments of the present disclosure.

The embodiments of the present disclosure further provide a schematic for the Mobility Management Entity. With reference to FIG. 20, the Mobility Management Entity comprises:

At least one processor 2010; FIG. 20, uses, as an example, one processor 2010; as well as the memory 2020, and can also comprise the Communications Interface 2030 and the Bus 2040, wherein, the processor 2010, the memory 2020, and the Communications Interface 2030 can communicate with each other through the Bus 2040; the Communications Interface 2030 can be used for information transmission; the processor 2010 can use the logic instructions on the memory 2020 in order to execute the data transmission methods of the MME-side of the present embodiments.

Beyond this, the logic instructions of the memory 2020 can be implemented as software functional units, and when sold as independent products, can be stored on a computer-readable storage medium.

As a computer-readable storage medium, the memory 2020 can be used to store software programs, computer-executable programs, and modules, such as the programs/modules (e.g., the transmission module 31, the receiver module 32, and the mode-switching module 33 illustrated by FIG. 16) corresponding to the data transmission methods of the MME-side executed in the embodiments of the present disclosure. The processor 2010 runs the software programs, instructions, and modules stored in the memory 2020, thereby carrying out the functional applications and data processing, that is, implementing the data transmission methods of the user equipment-side of the present embodiments.

The memory 2020 can comprise a program storage area and a data storage area, wherein, the program storage area can store the operating system and at least one application program required by the function; the data transmission area can store data created based on terminal usage, etc. Beyond this, the memory 2020 can comprise high-speed random access memory, and can also comprise non-volatile memory. The processor 2010 runs the software programs, instructions, and modules stored in the memory 2020, thereby carrying out the functional applications and data processing, that is, implementing the data transmission methods of the user equipment-side of the present embodiments.

The technical solutions of the embodiments of the present disclosure can take the form of computer software products stored in a storage medium, comprising one or more sets of instructions used to to make one computer device (e.g., a personal computer, a server, or a network device, etc.) execute all of or a portion of the steps of the methods of the embodiments of the present disclosure. The computer storage medium can be a non-volatile storage medium, comprising a variety of storage mediums that can store program code such as a USB flash disk, a hard disk, Read-Only memory (ROM), Random Access Memory (RAM), a magnetic disk, or an optical disk; it can also be a transient storage medium.

It will be apparent to those of ordinary skill in the related art that all of or a portion of the steps of the above methods can be carried out with a program instructing the relevant hardware (e.g., a processor), wherein the program can be stored on a computer-readable storage memory, such as ROM, a magnetic disk, or an optical disk. Alternatively, all of or a portion of the steps of the above embodiments can be implemented using one or multiple integrated circuits. Correspondingly, the modules/units of the above embodiments can be implemented in the form of hardware, such as implementing the corresponding functions with an integrated circuit, and can also be implemented using software functional units, such as a processor executing the program/instructions stored on the memory to implement the corresponding functions. The embodiments of the present disclosure can be any combination of hardware and software.

Although the embodiments of the present disclosure are thus described, the content is meant only to facilitate the understanding of the present disclosure and its embodiments, and is not meant to limit the present disclosure.

INDUSTRIAL APPLICABILITY

The embodiments of the present disclosure provide a method, apparatus, and system for data transmission. The present disclosure provides a method, apparatus, and system for data transmission. In the embodiments of the present invention, the User Equipment (UE) actively initiates a switching request of the data transmission mode, thereby satisfying the QoS requirements for varying services, as well as raising the intelligence of data transmission.

What is claimed is:

1. A method performed by a wireless communication device, comprising:
   in response to determining that a service type for a data transmission has changed, determining that a data transmission mode should be changed;
   in response to determining date transmission mode should be changed, transmitting a first message to be received by a Mobility Management Entity (MME), the first message containing instructions to change the data transmission mode between a plurality of data transmission modes based on a present service type of the data transmission, the plurality of data transmission modes comprising: a Control Plane (CP) mode and a User Plane (UP) mode;
   receiving a second message from a wireless communication node comprising an instruction to change the data transmission mode;
   based on the instruction of the second message, switching the data transmission mode from the CP mode to the UP mode; and
   establishing a Data Radio Bearer (DRB) for data transmission.

2. The method of claim 1, wherein the instruction of the second message is indicated as a bitmap.

3. The method of claim 1, wherein the instruction of the second message comprises a reason to change the transmission mode.

4. The method of claim 1, wherein the first message is an uplink Non-Access Stratum (NAS) message.

5. The method of claim 1, wherein the second message is a radio resource control (RRC) message.

6. A method performed by a Mobility Management Entity (MME), comprising:
   receiving a first message transmitted by a wireless communication device, wherein the first message is transmitted by the wireless communication device when it determines that a data transmission mode should be changed in response to determining that a service type of a data transmission has changed, the first message containing instructions to change the data transmission mode between a plurality of data transmission modes based on a present service type of the data transmission, the plurality of date data transmission modes comprising: a Control Plane (CP) mode and a User Plane (UP) mode;
   based on the first message, causing a wireless communication node to transmit a second message to the wireless communication device that comprises an instruction to change the data transmission mode; and
   establishing a Data Radio Bearer (DRB) for data transmission.

7. The method of claim 6, wherein the instruction of the second message is indicated as a bitmap.

8. The method of claim 6, wherein the instruction of the second message comprises a reason to change the transmission mode.

9. The method of claim 6, wherein the first message is an uplink Non-Access Stratum (NAS) message.

10. The method of claim 6, wherein the second message is a radio resource control (RRC) message.

11. A non-transitory computer-readable medium having stored thereon computer-executable instructions for carrying out any one of the methods of claims 1 through 10.

12. A wireless communication device, comprising:
    at least one processor configured to determine that a data transmission mode should be changed in response to determining that a service type of a data transmission has changed;
    a transmitter configured to transmit a first message to be received by a Mobility Management Entity (MME) when it is determined that the data transmission mode should be changed, the first message containing instructions to change the data transmission mode between a plurality of data transmission modes based on a present service type of the data transmission, the plurality of data transmission modes comprising: a Control Plane (CP) mode and a User Plane (UP) mode; and
    a receiver configured to receive a second message from the wireless communication node comprising an instruction to change the data transmission mode, wherein the at least one processor is further configured to, based on the instruction of the second message, switch the data transmission mode from the CP mode to the UP mode, and establish a Data Radio Bearer (DRB) for data transmission.

13. The wireless communication device of claim 12, wherein the instruction of the second message is indicated as a bitmap.

14. The wireless communication device of claim 12, wherein the instruction of the second message comprises a reason to change the transmission mode.

15. The wireless communication device of claim 12, wherein the first message is an uplink Non-Access Stratum (NAS) message.

16. The wireless communication device of claim 12, wherein the second message is a radio resource control (RRC) message.

17. A Mobility Management Entity (MME), comprising:
a receiver configured to receive a first message transmitted by a wireless communication device, wherein the first message is transmitted by the wireless communication device when the wireless communication device determines that a data transmission mode should be changed in response to determining that a service type of a data transmission has changed, the first message containing instructions to change the data transmission mode between a plurality of data transmission modes based on a present service type of the data transmission, the plurality of data transmission modes comprising: a Control Plane (CP) mode and a User Plane (UP) mode; and
at least one processor configured to, based on the first message, cause the MME to transmit a second message to the wireless communication device that comprises an instruction to change the data transmission mode, and establish a Data Radio Bearer (DRB) for data transmission.

18. The MME of claim 17, wherein the instruction of the second message is indicated as a bitmap.

19. The MME of claim 17, wherein the instruction of the second message comprises a reason to change the transmission mode.

20. The MME of claim 17, wherein the first message is an uplink Non-Access Stratum (NAS) message.

21. The MME of claim 17, wherein the second message is a radio resource control (RRC) message.

* * * * *